United States Patent [19]
Toshiro et al.

[11] Patent Number: 5,599,642
[45] Date of Patent: Feb. 4, 1997

[54] LITHIUM SECONDARY BATTERY CONTAINING ORGANIC ELECTROLYTE, ACTIVE MATERIAL FOR CATHODE THEREOF, AND METHOD FOR MANUFACTURING THE ACTIVE MATERIAL

[75] Inventors: Hiroyuki Toshiro, Ibaraki; Kazunobu Matsumoto, Osaka; Akira Kawakami, Takatsuki, all of Japan

[73] Assignee: Hitachi Maxell, Ltd., Osaka, Japan

[21] Appl. No.: 379,495

[22] PCT Filed: May 30, 1994

[86] PCT No.: PCT/JP94/00852

§ 371 Date: Jun. 9, 1995

§ 102(e) Date: Jun. 9, 1995

[87] PCT Pub. No.: WO94/28591

PCT Pub. Date: Dec. 8, 1994

[30] Foreign Application Priority Data

May 31, 1993 [JP] Japan .................... 5-154147
Oct. 20, 1993 [JP] Japan .................... 5-285669
Mar. 16, 1994 [JP] Japan .................... 6-072661

[51] Int. Cl.$^6$ .................................................. H01M 6/14
[52] U.S. Cl. .................... 429/194; 429/218; 429/223; 423/594
[58] Field of Search .................. 429/218, 223, 429/194; 423/594, 641

[56] References Cited

U.S. PATENT DOCUMENTS 4,980,080  12/1990  Lecerf et al. ............... 429/223 X
5,180,574  1/1993   Von Sacken ................ 423/594
5,308,720  5/1994   Kurokawa et al. ........... 429/194
5,316,875  5/1994   Murai et al. ............... 429/223 X
5,358,805  10/1994  Fujimoto et al. ............ 429/218
5,370,948  12/1994  Hasegawa et al. ........... 423/594 X
5,449,577  9/1995   Dahn et al. ............... 429/218 X
5,474,752  12/1995  Yamamoto .................. 423/594

FOREIGN PATENT DOCUMENTS 63-59507  11/1988  Japan .
2-040861  9/1990   Japan .

OTHER PUBLICATIONS

Ueda et al., J. Electrochem. Soc., vol. 141, No. 8, Aug. 1994, pp. 2010–2014.

Primary Examiner—Anthony Skapars
Attorney, Agent, or Firm—Birch, Stewart, Kolasch & Birch, LLP

[57] ABSTRACT

The lithium secondary battery uses lithium or a compound containing lithium as an anode active material, and lithium nickel oxide as a cathode active material. This battery is produced to enhance the charge and discharge capacity. The lithium nickel oxide is prepared as follows. Nickel oxide which contains nickel of more than trivalence or a nickel salt which produces nickel of more than trivalence when heated, and lithium salt are mixed at an Li/Ni (molar salt ratio) of 1.0 to 1.5. After preheating the mixture, it is baked at a temperature of 680° C. to 780° C. in an oxygen atmosphere, thus producing a lithium nickel oxide. The primary differential absorption spectrum of the electron spin resonance of the lithium nickel oxide is a singlet (single line) when measured by use of an X band at a temperature of 77 K., and the line distance (ΔHpp) between the peaks is 140 mT or more. The intensity ratio of the main peak of the components other than the lithium nickel oxide and that of the lithium nickel oxide in a powder X-ray diffraction image is lower than 0.03. The Li/Ni ratio (atomic ratio) is above 0.9, and the grain size of the primary particles is below 1 μm.

10 Claims, 17 Drawing Sheets

LITHIUM SECONDARY BATTERY CONTAINING ORGANIC ELECTROLYTE, ACTIVE MATERIAL FOR CATHODE THEREOF, AND METHOD FOR MANUFACTURING THE ACTIVE MATERIAL

The present invention relates to a lithium secondary battery, particularly relates to a lithium secondary battery comprising a lithium nickel oxide as an improved cathode active material, the cathode active material and a method for preparing the same.

BACKGROUND OF THE INVENTION

The lithium nickel oxide is $LiNiO_2$ when the ratio of Li (lithium) and Ni (nickel) is 1:1 (atomic ratio) exactly according to the stoichiometric composition ratio, and possesses a lamellar structure same as $LiCoO_2$ or the like, and hence its utility as cathode active material for lithium secondary battery is expected.

However, in the conventional synthesis of lithium nickel oxide, the ratio of Li and Ni tends to be deviated from the stoichiometric composition ratio, and Ni invades into the Li layer and the lamellar structure is disturbed, and therefore when used as a cathode active material for a lithium secondary battery, the charging and discharging capacity is smaller than the value expected from $LiNiO_2$ with Li and Ni atomic ratio of 1:1.

Specifically describing the method of synthesis of conventional lithium nickel oxide and the Li/Ni atomic ratio of thus synthesized lithium nickel oxide, hitherto, the lithium nickel oxide was synthesized by heating the lithium hydroxide hydrate ($LiOH.H_2O$) and nickel (Ni) powder in oxygen ($O_2$) atmosphere at 750° C. for 12 hours, pulverizing again, and further baking, as disclosed, for example, in Japanese Patent Tokkosho No. 63-59507.

What is actually obtained is, however, not $LiNiO_2$ at the stoichiometric composition ratio of 1:1 (atomic ratio) of Li and Ni, but instead a composition of $Li_{0.85}Ni_{1.15}O_2$, having a Li/Ni ratio (atomic ratio) is 0.74, in which the lamellar structure was disturbed, and when used as cathode active material for lithium secondary battery, only a battery of small charging and discharging capacity was obtained as mentioned above.

If Li/Ni ratio (atomic ratio) is 1 according to the stoichiometric composition ratio, since it is possible that the crystal configuration of Li and Ni is random or disorder and it is believed that a part of Ni may invade into the layer of Li, thereby charging and discharging capacity being decreasing.

It is hence the first object of the present invention to provide a lithium secondary battery having a large charging and discharging capacity by solving the problem of small charging and discharging capacity of the lithium secondary battery when the lithium nickel oxide synthesized in the conventional method is used as cathode active material.

It is also the second object of the present invention to provide a cathode active material used in said lithium secondary battery.

Moreover, it is the third object of the present invention to provide a method for manufacturing the cathode active material used in said lithium secondary battery.

DISCLOSURE

The invention is achieved by synthesizing the lithium nickel oxide to be used as cathode active material for lithium secondary battery, by mixing 1) a nickel oxide containing nickel with valence of 3 or more or a nickel salt for producing nickel with valence of 3 or more by heating, and 2) a lithium salt, at Li/Ni (molar salt ratio)=1.0 to 1.5, and heating, thereby synthesizing a lithium nickel oxide of which primary differential absorption spectrum of electron spin resonance measured at a temperature of 77 K. by using X band is a singlet, and intensity ratio of main peak other than lithium nickel oxide and peak of lithium nickel oxide in powder X-ray diffraction image (CuKα ray) is 0.03 or less.

That is, the present invention is to provide a lithium secondary battery containing organic electrolyte using lithium or a compound containing lithium as an anode, lithium nickel oxide as the active material for a cathode and organic electrolyte, wherein the cathode active material is a lithium nickel oxide of which primary differential absorption spectrum of electron spin resonance measured at temperature 77 K. by using X band is a singlet, and intensity ratio of main peak other than the lithium nickel oxide and main peak of the lithium nickel oxide in powder X-ray diffraction image (CuKα ray) is 0.03 or less.

Furthermore, the present inventors have found that the lithium nickel oxide having the said characteristics concerning to the spectrum of electron spin resonance and the intensity ratio of the peaks in powder X-ray diffraction image, and the electronic structure which indicates the line width ($\Delta Hpp$) between the peaks of the primary differential absorption spectrum of the electron spin resonance is 140 mT or more, is superior as a cathode active material and can provide a lithium secondary battery having a large charging and discharging capacity.

That the primary differential absorption spectrum of electron spin resonance of lithium nickel oxide is a singlet even at a lower temperature means that the nickel (Ni) in the lithium nickel oxide has a valence of 3 and that the electron state around nickel is suited to charging and discharging function, which fact has been found for the first time by the inventors. That is, hitherto, there have been reported a correlation between the X-ray diffraction and the charging and discharging capacity and a correlation between the nickel valency and the charging and discharging capacity, but they have not always coincided with the charging and discharging capacity.

The present inventors investigated into the synthesis of lithium nickel oxide by using nickel oxide ($Ni_2O_3$) and synthesized one large in charging and discharging capacity. Analyzing it by electron spin resonance, we have found that such lithium nickel oxides of high capacity present a certain signal in electron spin resonance. Thus, in the lithium nickel oxide of which primary differential absorption spectrum of electron spin resonance is singlet, the Li/Ni ratio (atomic ratio) is almost always 1, which make it possible to provide the lithium secondary battery with large charging and discharging capacity.

The electron spin resonance spectrum is measured at temperature 77 K. because exchange of magnetic energy into thermal motion energy of lattice vibration is decreased by lowering the measuring temperature so as to intensify the absorption strength and it is possible to measure at a relatively low cost because 77 K. is the boiling point of liquid nitrogen. It is, however, possible to measure in a range of 50 K. to 120 K.

In the powder X-ray diffraction image of the lithium nickel oxide, the intensity ratio of 0.03 or less of the main peak of other than lithium nickel oxide and the main peak (appearing at 2θ=18° to 19°) of lithium nickel oxide means that the content other than lithium nickel oxide, or impurity is very small, and thus the lithium nickel oxide is high in purity and small in impurity, thereby a lithium secondary battery of large charging and discharging capacity may be obtained.

The present inventors also found that, as the lithium nickel oxide used for a cathode active material of the said lithium secondary battery, the lithium nickel oxide containing nickel with valence of 3 or more or nickel salt for producing nickel with valence of 3 or more by heating, and lithium salt, are mixed to be close to 1 at Li/Ni (atomic ratio) and make the average grain size of the primary particles below 1 μm. The material is preferred to make the charging and discharging capacity large. Accordingly, the present invention is to provide the lithium secondary battery containing organic electrolyte, wherein Li/Ni ratio (atomic ratio) of the lithium nickel oxide is 0.9 or more and the average grain size of the primary particles is 1 μm or less.

Examples of nickel oxides containing nickel with valence of 3 or more or nickel salts producing nickel with valence of 3 or more by heating include nickel oxide (III) ($Ni_2O_3$), NiOOH, $Li_2NiO_3$, and $Li_2NiO_{3-a}$ wherein $0<a\leq0.3$. Among them, nickel oxide (III) ($Ni_2O_3$) is particularly preferable because lithium nickel oxide of high capacity is obtained.

Nickel oxide (III) is not obtained in a pure form of $Ni_2O_3$, but $H_2O$ or OH group is likely to be contained slightly. That is, Nickel oxide (III) is not obtained in a complete unhydrate form, always in a hydrate form. The inventors determined the Ni content per unit weight of nickel oxide by titration, and 0.698 g to 0.710 g of Ni was contained in 1 g of sample, which nearly coincides with the calculated value in $Ni_2O_3$ (Ni content of 0.7098 g), and hence it was identified to be a nickel salt with valence of 3. According to the thermal analysis to measure the weight variation while raising the temperature, it is observed that oxygen is discharged from the oxide and the weight loss is coincided with the weight difference between $Ni_2O_3$ and NiO, and hence it was also identified to be the nickel salt with valence of 3.

As examples of lithium salt, lithium oxide ($Li_2O$) and lithium hydroxide hydrate ($LiOH.H_2O$) are available. In particular, lithium hydroxide hydrate ($LiOH.H_2O$) is preferable as its Li source to synthesize lithium nickel oxide because the melting point is low and it is easily mixed uniformly.

In the invention, in synthesis of the lithium nickel oxide, the nickel oxide containing nickel with valence of 3 or more or the nickel salt producing nickel with valence of 3 or more by heating is used as its Ni source because it is easy to produce lithium nickel oxide containing nickel with valence of 3, and it is also easy to obtain a lithium nickel oxide of which atomic ratio of Li and Ni ($(1-x)/(1+x)$) in $Li_{1-x}Ni_{1+x}O_2$ is close to the stoichiometric composition ratio of 1:1 (atomic ratio) by preventing the entry of nickel with valence of 2.

In synthesis of lithium nickel oxide, 1) a nickel oxide containing nickel with valence of 3 or more or nickel salt producing nickel with valence of 3 or more by heating, and 2) a lithium salt are mixed, and the mixture is heated. This heat treatment should be done in an oxygen stream, under an oxygen pressure, or in an oxygen atmosphere, because it is suited to obtain lithium nickel oxide closer to the stoichiometry composition ratio.

That is, when heated in oxygen atmosphere, the stability of nickel with valence of 3 is increased, and formation of nickel with valence of 2 can be inhibited, so that it is easier to produce an ideal lithium nickel oxide with the Li/Ni ratio (atomic ratio) close to 1.

Therefore, the present invention is to provide a method for synthesizing the lithium nickel oxide used for a cathode active material for the lithium secondary battery, which comprises steps of mixing 1) a nickel oxide of more than trivalence or a nickel salt which produces nickel of more than trivalence when heated and 2) a lithium salt at an Li/Ni (molar salt ratio) of 1.0 to 1.5, baking the mixture at a temperature of 680° C. to 780° C. after preheating, preferably in an oxygen atmosphere such as in the oxygen stream or under the oxygen pressure.

Moreover, in synthesis of lithium nickel oxide, the mixing ratio of 1) the nickel oxide containing nickel with valence of 3 or more or the nickel salt producing nickel with valence of 3 or more by heating and 2) lithium salt is preferred in a range of Li/Ni ratio (molar salt ratio) of 1.0 to a slightly lithium salt excessive Li/Ni ratio (molar salt ratio) of 1.5. In particular, the Li/Ni ratio (molar salt ratio) is preferred to be in a range of 1.01 to 1.3, more preferably Li/Ni ratio (molar salt ratio) of around 1.1.

Thus, in the heat treatment, the Li/Ni ratio (molar salt ratio) is preferred to be slightly larger than 1 because lithium salt is likely to be evaporated in the heat treatment and the Li/Ni ratio (molar salt ratio) tends to be lower in the synthesized lithium nickel oxide, and it is also preferred to mix at the Li/Ni ratio (molar salt ratio) of 1.5 or less because, if the Li/Ni ratio (molar salt ratio) is more than 1.5, the unreacted lithium salt impedes the charging and discharging reaction in the battery system, resulting in a smaller charging and discharging capacity. The Li/Ni ratio (atomic ratio) in the synthesized lithium nickel oxide can be determined by measuring the Li content by the atomic absorption method, and measuring the Ni content by the chelate titration method.

The Li/Ni ratio (atomic ratio) of lithium nickel oxide is preferred to 0.9 or more, because the lamellar structure is not disordered and it is easy to obtain the lithium secondary battery of large discharge and discharge capacity. The Li/Ni ratio (atomic ratio) of lithium nickel oxide is preferred to be closer and closer to 1 of the stoichiometric composition ratio, but it may exceed 1 and be reached to about 1.5.

In the present invention, the average grain size of lithium nickel oxide is preferred to be 1 μm or less, because if it exceed 1 μm, the reacting surface area is decreased as a cathode active material and the charge and discharge capacity becomes small. There is no problem in the discharge performance even if the smaller grain is used. However, it is not easy to handle the smaller ones, therefore the average grain size of 0.3 μm or more is preferred to use. The grain size of lithium nickel oxide in the present invention is determined by SEM (Scanning Electron Microscope) and such grain size is sometimes different from that determined by particle size distributor such as laser diffraction system.

The temperature of heat treatment at synthesizing lithium nickel oxide is preferred in a range of 680° to 780° C., because, when the temperature of heat treatment is less than 680° C., the reaction progress is slow, and when the temperature of heat treatment exceeds 780° C., the Li/Ni atomic ratio in lithium nickel oxide becomes smaller and the particle size larger. The heat treatment time is preferred in a range of 5 to 30 hours, though variable depending on the temperature of heat treatment.

In the above heat treatment, before raising to 680° to 780° C., it is preferred to heat preliminarily to 400° to 600° C. This is because nickel with valence of 3 is unstable against heat, and if heated to 680° to 780° C. at once, it is likely to be transformed into nickel with valence of 2. The duration of this preliminary heating is not particularly limited, but usually it is preferred to be about 1 to 10 hours.

Therefore, the heat treatment should be done through a step of preliminary heating, and it is particularly preferred to preheat to 400° to 600° C. for 2 to 4 hours, and then heat to 680° to 780° C. for 5 to 20 hours, and the latter step of heat treatment may be called "baking" to be distinguished from preheating. It is preferred to carry out the heat treatment, of course, in an oxygen atmosphere such as oxygen stream and oxygen pressure.

In the invention, the lithium nickel oxide refers to the compound expressed as $LiNiO_2$ when Li and Ni are synthesized in the stoichiometric composition ratio of 1:1 (atomic ratio), but actually the ratio of Li and Ni is often deviated from the stoichiometric composition ratio, and therefore it is mentioned as "lithium nickel oxide", not "$LiNiO_2$" in the specification.

The cathode is prepared by mixing the lithium oxide with, as required, electron conduction aids such as phosphorous graphite and acetylene black, and binders such as polytetrafluoroethylene and polyvinylidene fluoride, and forming the obtained cathode mixture by proper means.

The anode is composed of lithium or a lithium containing compound, and this lithium containing compound is classified into a lithium alloy and others.

Examples of lithium alloy include lithium-aluminum, lithium-lead, lithium-indium, lithium-gallium, and lithium-indium-gallium. Examples of lithium containing compound other than lithium alloy include a carbon material with lamellar structure, graphite, tungsten oxide, and lithium iron complex oxide.

Among these examples of lithium containing compound, some do not contain lithium at the time of manufacture, but when acting as the anode, they are transformed in a state containing lithium. Above all, graphite is preferred from the viewpoint of large capacity density.

The electrolyte is an organic electrolyte prepared by dissolving one or two or more electrolytes selected from the group consisting of $LiCF_3SO_3$, $LiC_4F_9SO_3$, $LiClO_4$, $LiPF_6$, and $LiBF_4$ in a single solvent or a mixed solvent of two or more types selected from the group consisting of 1,2-dimethoxy ethane, 1,2-diethoxy ethane, propylene carbonate, ethylene carbonate, γ-butyrolactone, tetrahydrofuran, 1,3-dioxylane, diethyl carbonate, dimethyl carbonate, and methyl ethyl carbonate. Among them, propylene carbonate, ethylene carbonate, and methyl ethyl carbonate are particularly preferred because they are excellent in the cycle characteristic.

DETAILED DESCRIPTION OF THE PREFERRED EXAMPLES

The invention is further described below specifically by referring to embodiments. The invention is, however, not limited to these embodiments alone.

EXAMPLE 1

Lithium hydroxide hydrate ($LiOH.H_2O$) and nickel oxide (III) ($Ni_2O_3$) were heated, and lithium nickel oxide was synthesized. This synthesis was conducted in the following procedure.

Lithium hydroxide hydrate and nickel oxide (III) were weighed to be a ratio of Li/Ni=1.1/1 (molar salt ratio), and pulverized and mixed by using a ball mill. The mixture was preheated to 500° C. in oxygen stream for 2 hours, and raised up to 700° C. at heating rate of 50° C./hr or less, and baking at 700° C. was performed for 20 hours.

Figure 2:
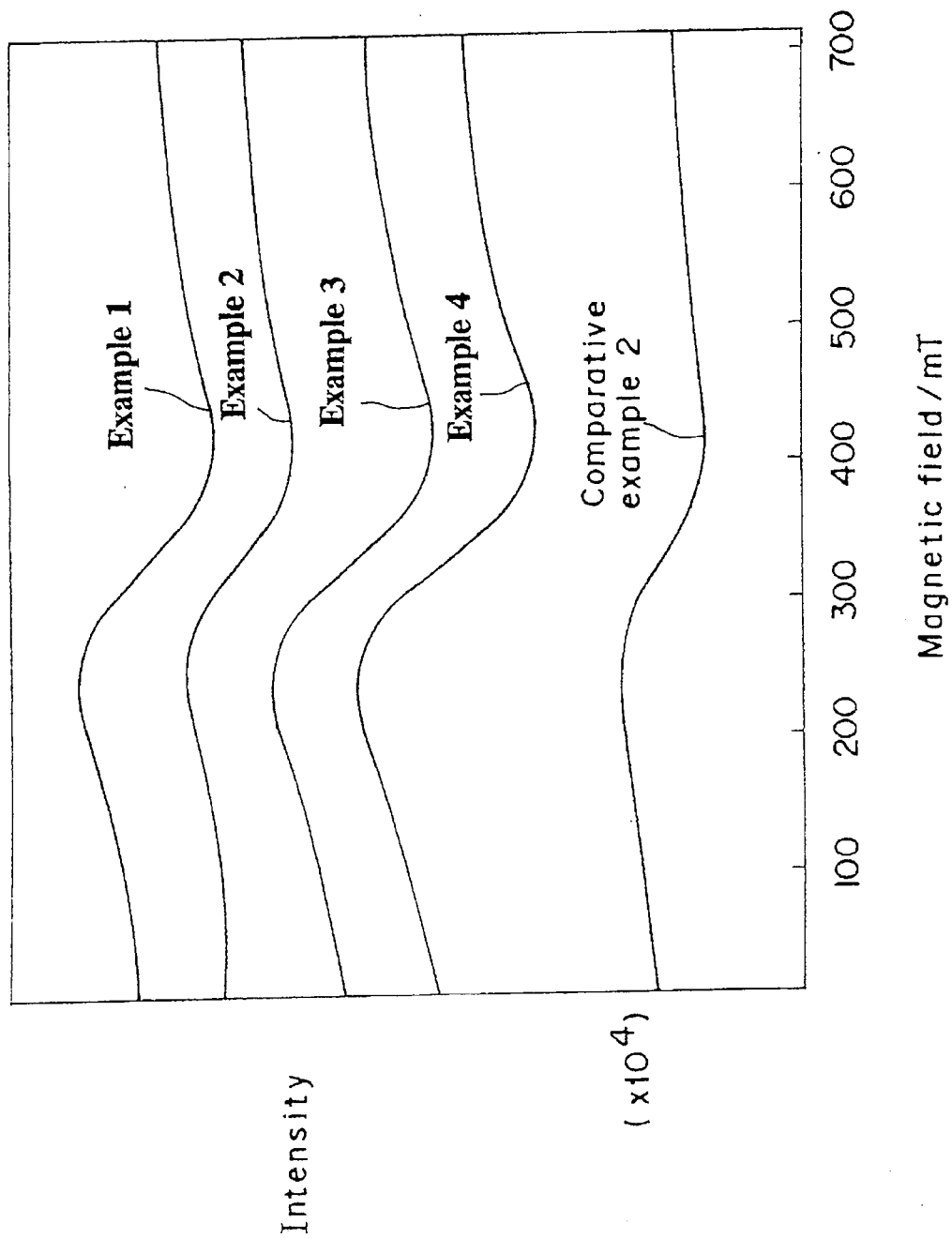
FIG. 2 is a diagram schematically showing electron spin resonance spectrum of lithium nickel oxide used as cathode active material in Examples 1 to 4 and Comparative Example 2.

The electron spin resonance of the synthesized lithium nickel oxide was measured at temperature 77 K. by using X band, and the primary differential absorption spectrum of electron spin resonance was singlet as shown in FIG. 2, and the line width ($\Delta Hpp$) between peaks was 166 mT.

To measure the electron spin resonance of lithium nickel oxide, electron spin resonance measuring instrument ESP300E made by BRUCKER Inc. was used, and a powder sample was put in a quartz capillary and sealed in vacuum, and it was inserted into a liquid nitrogen Dewar vessel, and using X-band, it was measured at 77 K., the boiling point of liquid nitrogen.

Figure 4:
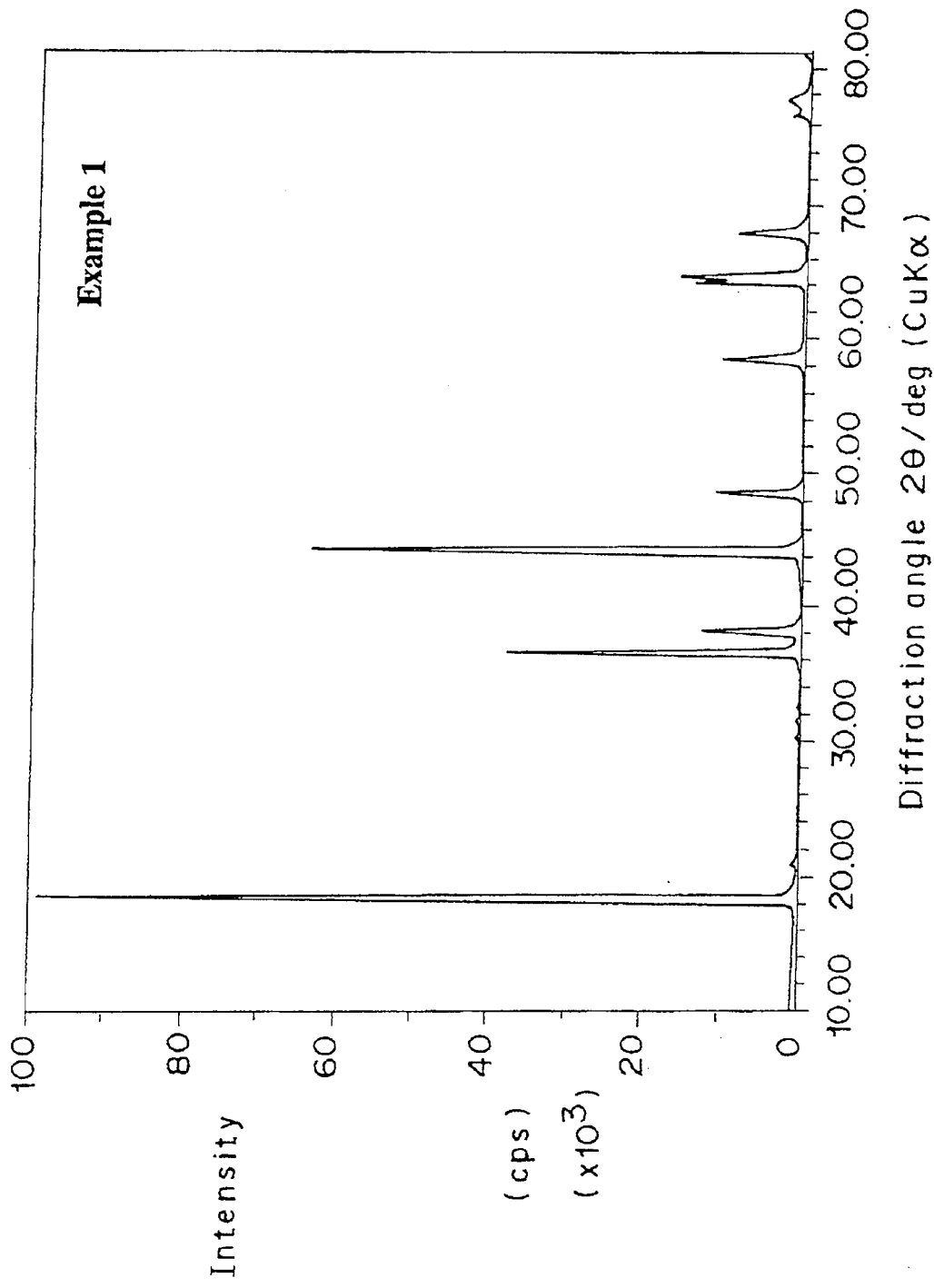
FIG. 4 is a diagram schematically showing X-ray diffraction image of lithium nickel oxide used as cathode active material in Example 1.

The line width ($\Delta Hpp$) between peaks of the primary differential absorption spectrum was determined by correcting the line width obtained from FIG. 2 by using $Mg^{2+}$/MgO standard sample. The powder X-ray diffraction image of synthesized lithium nickel oxide is schematically shown in FIG. 4. The intensity ratio of main peak other than the lithium nickel oxide and main peak of the lithium nickel oxide obtained from this powder X-ray diffraction image was 0.0098.

That is, the main peak of the lithium nickel oxide was a peak appearing at $2\theta=18°$ to $19°$, and its intensity was 99067 cps (counts per sec), and the main peak of other than the lithium nickel oxide was a peak appearing at $2\theta=31.68°$, and its intensity was 972 cps, and the intensity ratio of the main peak of other than the lithium nickel oxide and the main peak of the lithium nickel oxide was 0.0098 as mentioned above.

Incidentally, the intensity ratio of the main peak of other than the lithium nickel oxide and the main peak of the lithium nickel oxide is obtained in the following formula, supposing the ratio to be R, the intensity of main peak of other than lithium nickel oxide to be $P_1$, and the intensity of main peak of lithium nickel oxide to be $P_0$.

$$R=P_1/P_0$$

The Li/Ni ratio (atomic ratio) in the synthesized lithium nickel oxide was 0.93. This Li/Ni ratio (atomic ratio) in the synthesized lithium nickel oxide can be determined by measuring the Li content by the atomic absorption method, and measuring the Ni content by the chelate titration method. The average grain size of the primary particles of the synthesized lithium nickel oxide was 0.5 μm.

By using the lithium nickel oxide thus synthesized by heating as cathode positive material, and mixing it with phosphorous graphite as electron conduction aid and polytetrafluoroethylene as binder at a rate of 80:15:5 (ratio by weight), a cathode mixture was prepared.

Figure 1:
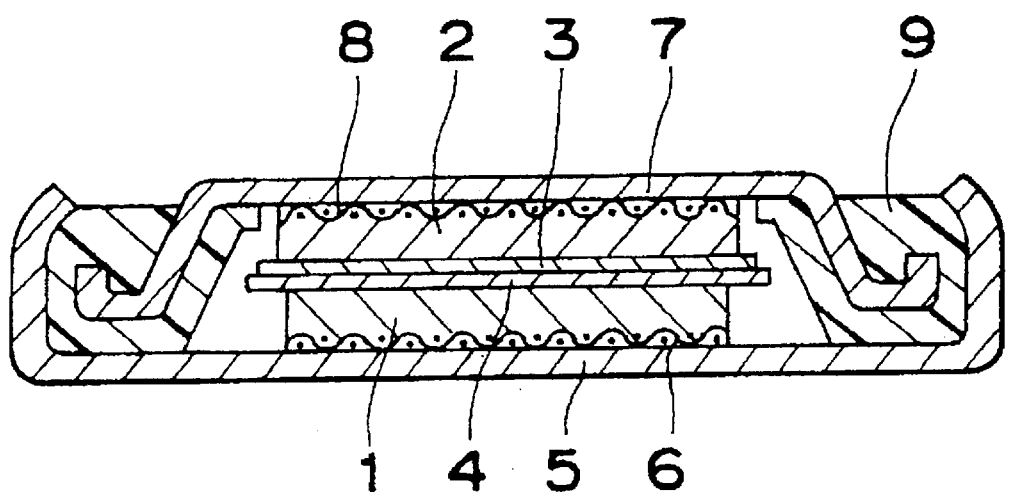
FIG. 1 is a sectional view showing an example of lithium secondary battery according to the present invention.

Pouring the cathode mixture into a mold, it was pressed and formed in a disk of 10 mm in diameter at 1 t/cm$^2$, and heated at 250° C. and a cathode was obtained Using this cathode, a button type lithium secondary battery in the structure as shown in FIG. 1 was fabricated.

In FIG. 1, reference numeral 1 is the cathode, 2 is an anode made of a disk-shaped lithium of 14 mm in diameter. 3 is a separator made of fine porous polypropylene film, and 4 is an electrolyte absorber made of nonwoven polypropylene cloth. 5 is a stainless steel cathode can, 6 is a stainless steel mesh cathode current collector, and 7 is a stainless steel anode can with nickel plated surface.

Reference numeral 8 is a stainless steel mesh anode current collector, which is spot-welded to the inside of the anode can 7, and the anode 2 is pressure-bonded to the stainless steel mesh anode current collector 8. Reference numeral 9 is a polypropylene annular gasket, and this battery is filled with an organic electrolyte dissolving 1 mol/liter of LiPF$_6$ into a mixed solvent of 1:1 ratio by volume of ethylene carbonate and methyl ethyl carbonate.

Please note, in Examples 1 to 4 and Comparative Examples 1 to 2 there is used the electrolyte while in the other Examples there is used an organic electrolyte dissolving 0.6 mol/liter of LiCF$_3$SO$_3$ into a mixed solvent of 1:1 ratio by volume of ethylene carbonate and 1,2-methoxyethane.

EXAMPLE 2

Lithium hydroxide hydrate (LiOH.H$_2$O) and nickel oxide (III) (Ni$_2$O$_3$) were weighed to be a ratio of Li/Ni=1/1 (molar salt ratio), and pulverized and mixed by using a ball mill, and heated to synthesize lithium nickel oxide. The condition of synthesis was same as in Example 1 except that the Li/Ni ratio (molar salt ratio) was changed to 1/1 (molar salt ratio). That, is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet as shown in FIG. 2, and the line width ($\Delta Hpp$) between the peaks was 165 mT.

Figure 5:
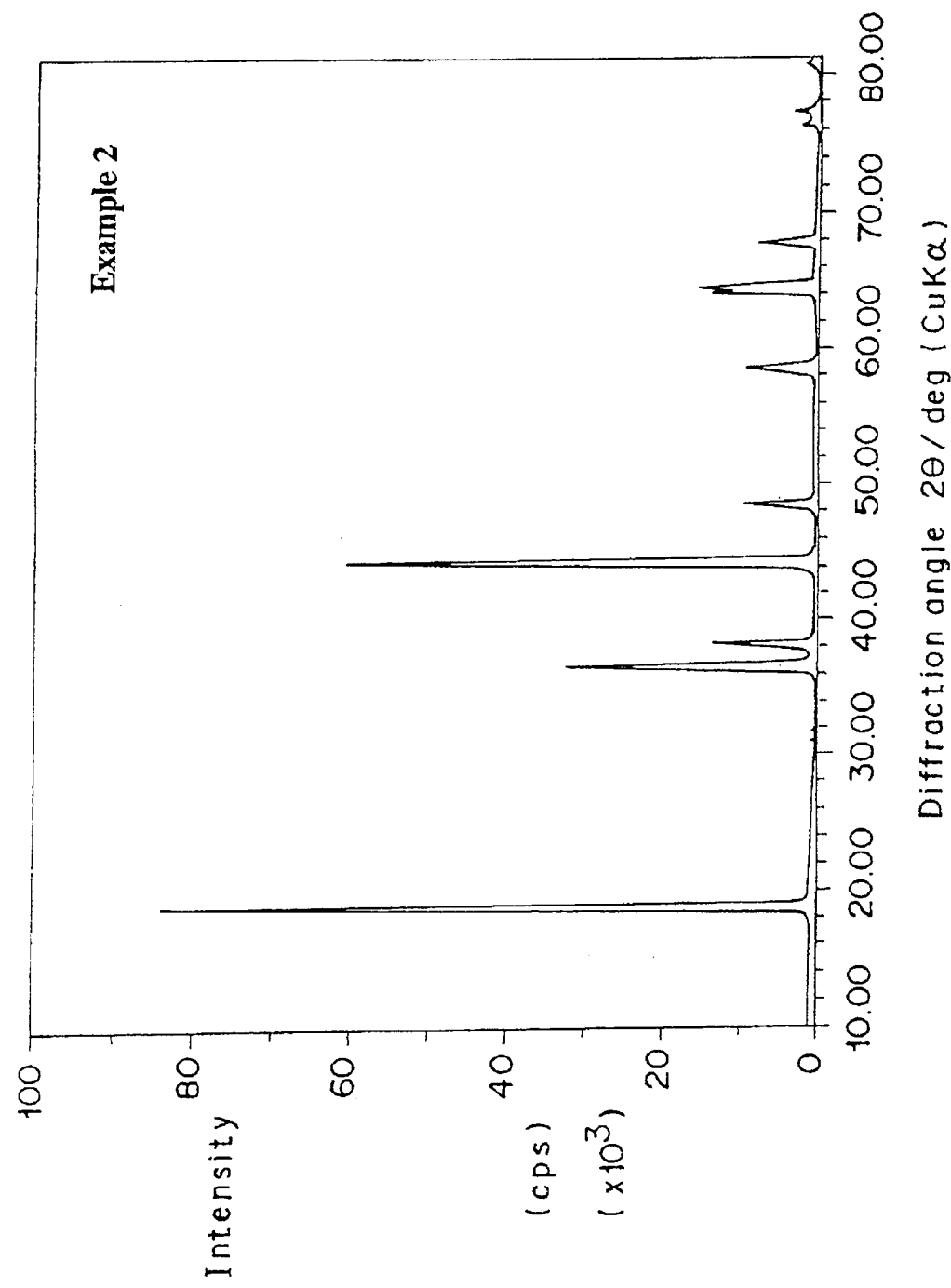
FIG. 5 is a diagram schematically showing X-ray diffraction image of lithium nickel oxide used as cathode active material in Example 2.

The powder X-ray diffraction image of the synthesized lithium nickel oxide is schematically shown in FIG. 5. The intensity ratio of the main peak of other than lithium nickel oxide and the main peak of lithium nickel oxide was 0.0099.

That is, the main peak of lithium nickel oxide was a peak appearing at $2\theta=18°$ to $19°$, and its intensity was 84535 cps, and the main peak of other than lithium nickel oxide was a peak appearing at $2\theta=31.62°$, and its intensity was 837 cps, and the intensity ratio of the main peak of other than lithium nickel oxide and the main peak of lithium nickel oxide was 0.0099 as mentioned above.

The Li/Ni ratio (atomic ratio) in the synthesized lithium nickel oxide was 0.90 and the average grain size of the primary particles was 0.5 μm.

Using thus synthesized lithium nickel oxide as cathode active material, a button type lithium secondary battery was fabricated in the same manner as in Example 1.

EXAMPLE 3

Lithium hydroxide hydrate (LiOH.H$_2$O) and nickel oxide (III) (Ni$_2$O$_3$) were weighed to be a ratio of Li/Ni=1.3/1 (molar salt ratio), and pulverized and mixed by using a ball mill, and heated to synthesize lithium nickel oxide. The condition of synthesis was same as in Example 1 except that the Li/Ni ratio (molar salt ratio) was changed to 1.3/1 (molar salt ratio). That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet as shown in FIG. 2, and the line width ($\Delta Hpp$) between the peaks was 175 mT.

Figure 6:
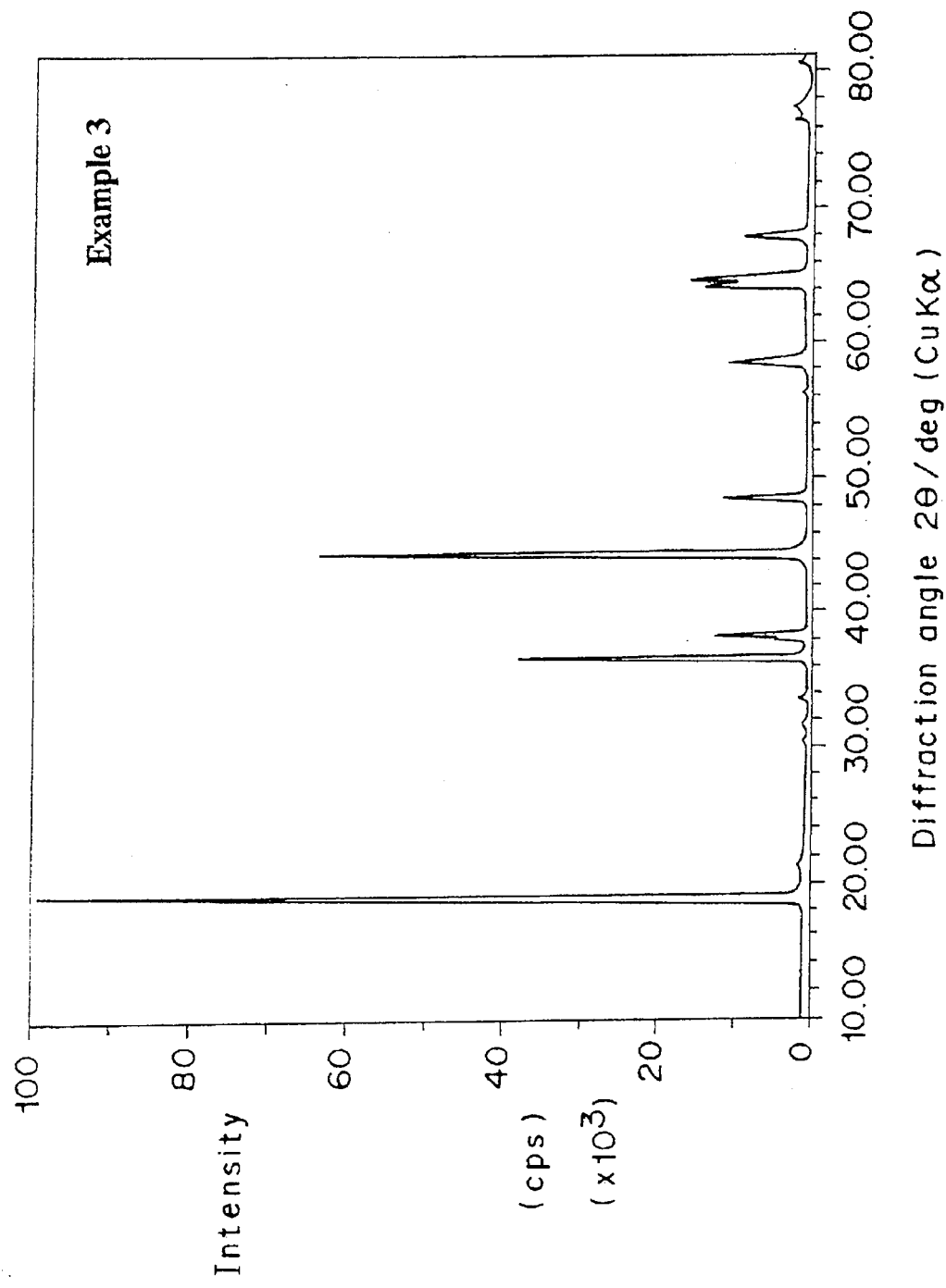
FIG. 6 is a diagram schematically showing X-ray diffraction image of lithium nickel oxide used as cathode active material in Example 3.

The powder X-ray diffraction image of the obtained lithium nickel oxide is schematically shown in FIG. 6. The intensity ratio of the main peak of other than lithium nickel oxide and the main peak of lithium nickel oxide was 0.016.

That is, the main peak of lithium nickel oxide was a peak appearing at $2\theta=18°$ to $19°$, and its intensity was 99382 cps, and the main peak of other than lithium nickel oxide was a peak appearing at $2\theta=33.54°$, and its intensity was 1635 cps, and the intensity ratio of the main peak of other than lithium nickel oxide and the main peak of lithium nickel oxide was 0.016 as mentioned above.

The Li/Ni ratio (atomic ratio) in the synthesized lithium nickel oxide was 0.94 and the average grain size of the primary particles was 0.5 μm.

Using thus synthesized lithium nickel oxide as cathode active material, a button type lithium secondary battery was fabricated in the same manner as in Example 1.

EXAMPLE 4

Lithium hydroxide hydrate (LiOH.$H_2O$) and nickel oxide (III) ($Ni_2O_3$) were weighed to be a ratio of Li/Ni=1.5/1 (molar salt ratio), and pulverized and mixed by using a ball mill, and heated to synthesize lithium nickel oxide. The condition of synthesis was same as in Example 1 except that the Li/Ni ratio (molar salt ratio) was changed to 1.5/1 (molar salt ratio). That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet as shown in FIG. 2, and the line width ($\Delta$Hpp) between the peaks was 177 mT.

Figure 7:
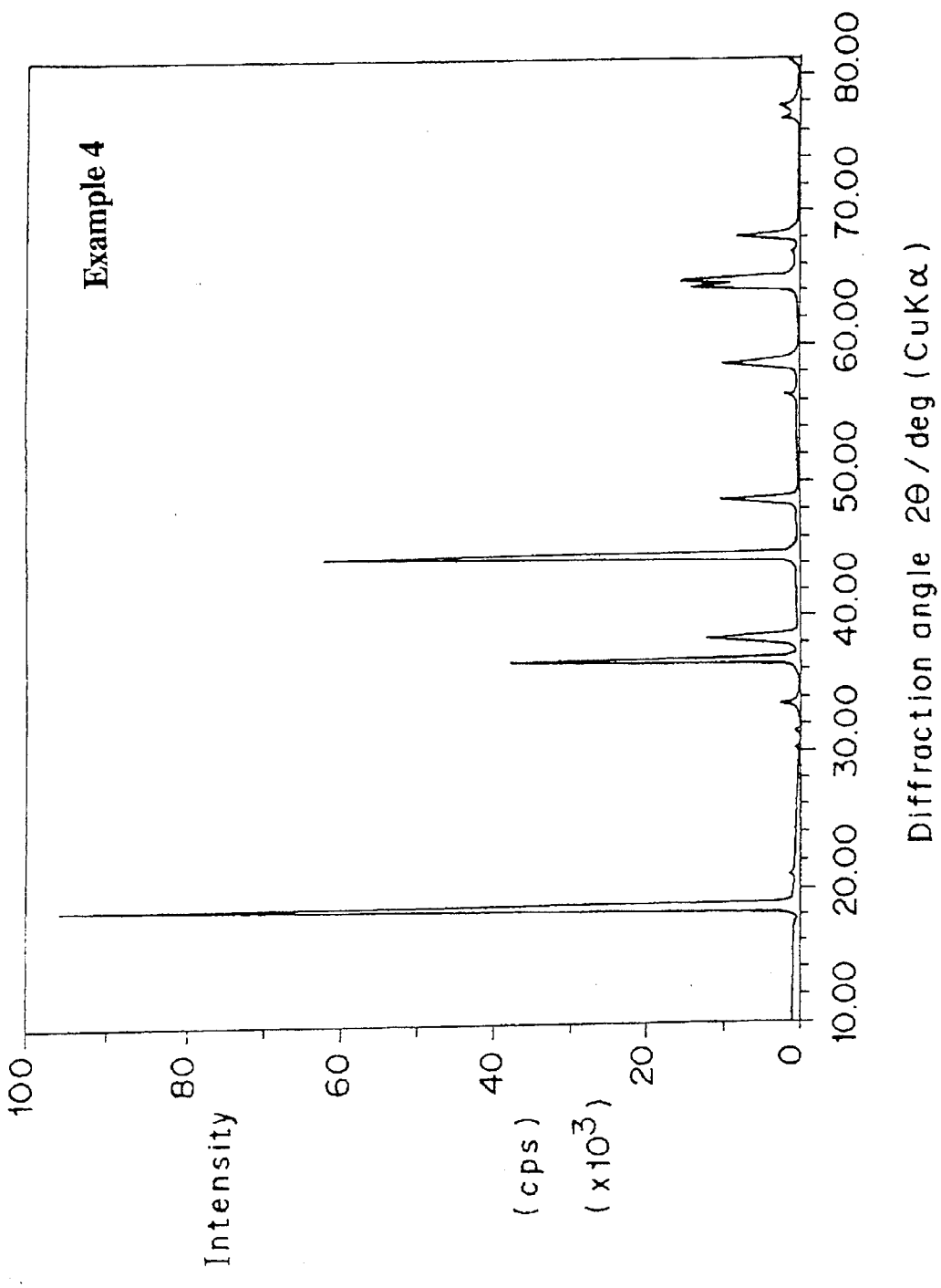
FIG. 7 is a diagram schematically showing X-ray diffraction image of lithium nickel oxide used as cathode active material in Example 4.

The powder X-ray diffraction image of the obtained lithium nickel oxide is schematically shown in FIG. 7. The intensity ratio of the main peak of other than lithium nickel oxide and the main peak of lithium nickel oxide was 0.029.

That is, the main peak of lithium nickel oxide was a peak appearing at 2θ=18° to 19°, and its intensity was 96332 cps, and the main peak of other than lithium nickel oxide was a peak appearing at 2θ=33.52°, and its intensity was 2795 cps, and the intensity ratio of the main peak of other than lithium nickel oxide and the main peak of lithium nickel oxide was 0.029 as mentioned above.

The Li/Ni ratio (atomic ratio) in the synthesized lithium nickel oxide was 0.94 and the average grain size of the primary particles was 0.5 μm.

Using thus synthesized lithium nickel oxide as cathode active material, a button type lithium secondary battery was fabricated in the same manner as in Example 1.

Comparative Example 1

Lithium hydroxide hydrate (LiOH.$H_2O$) and nickel oxide (III) ($Ni_2O_3$) were weighed to be a ratio of Li/Ni=0.75/1 (molar salt ratio), and pulverized and mixed by using a ball mill, and heated to synthesize lithium nickel oxide. The condition of synthesis was same as in Example 1 except that the Li/Ni ratio (molar salt ratio) was changed to 0.75/1 (molar salt ratio). That is, as the heat treatment, the mixture was preheated to 500° C. in oxygen stream for 2 hours, and raised up to 700° C. at heating rate of 50° C./hr or less, and baking at 700° C. was performed for 20 hours.

Figure 3:
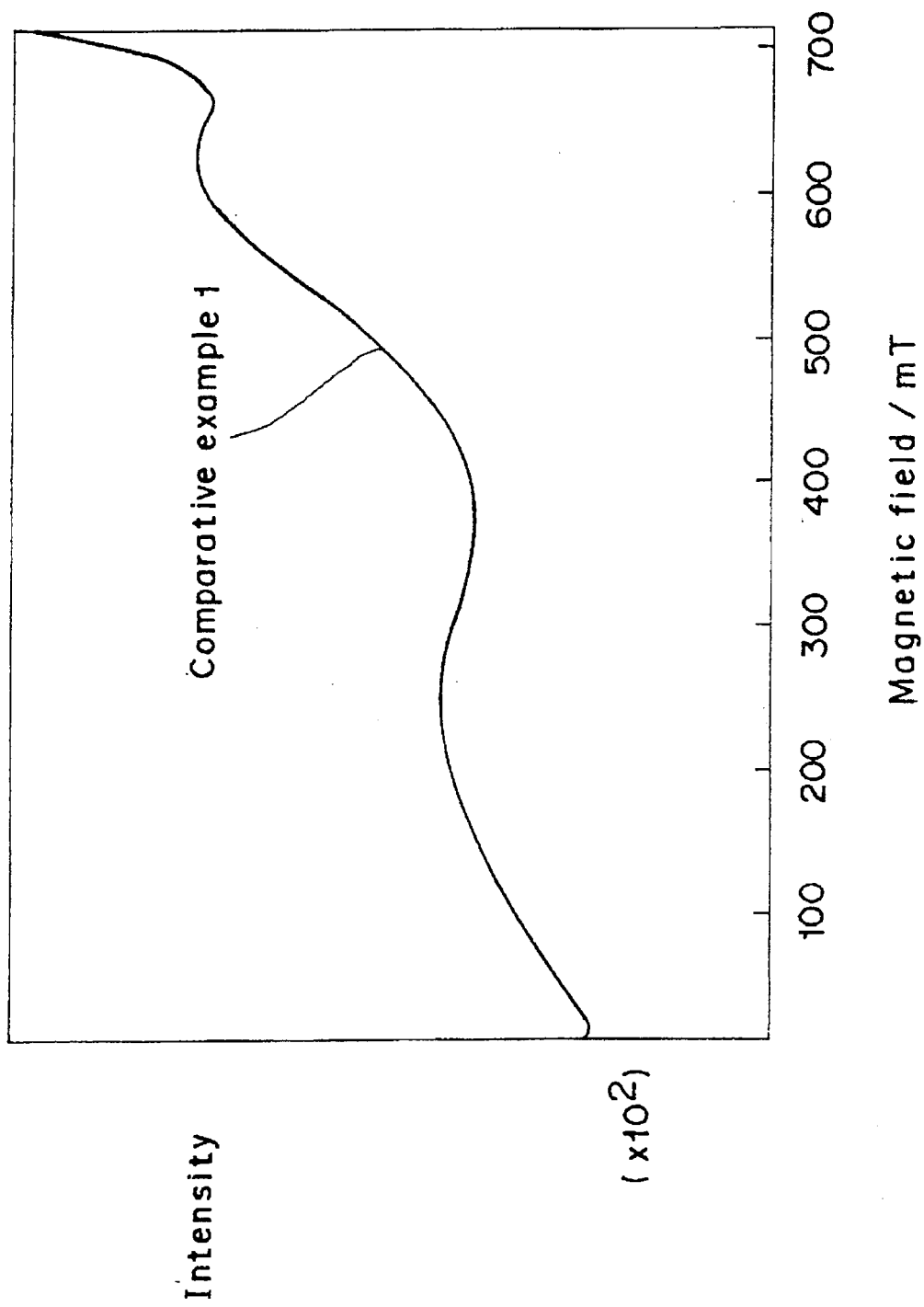
FIG. 3 is a diagram schematically showing electron spin resonance spectrum of lithium nickel oxide used as cathode active material in Comparative Example 1.

The electron spin resonance of the synthesized lithium nickel oxide was measured at temperature 77 K. by using X-band, but the electron spin resonance spectrum was not a primary differential absorption spectrum of singlet as in the foregoing embodiments, and a super-broad profile was obtained as shown in FIG. 3, and its line width ($\Delta$Hpp) could not be detected.

Figure 8:
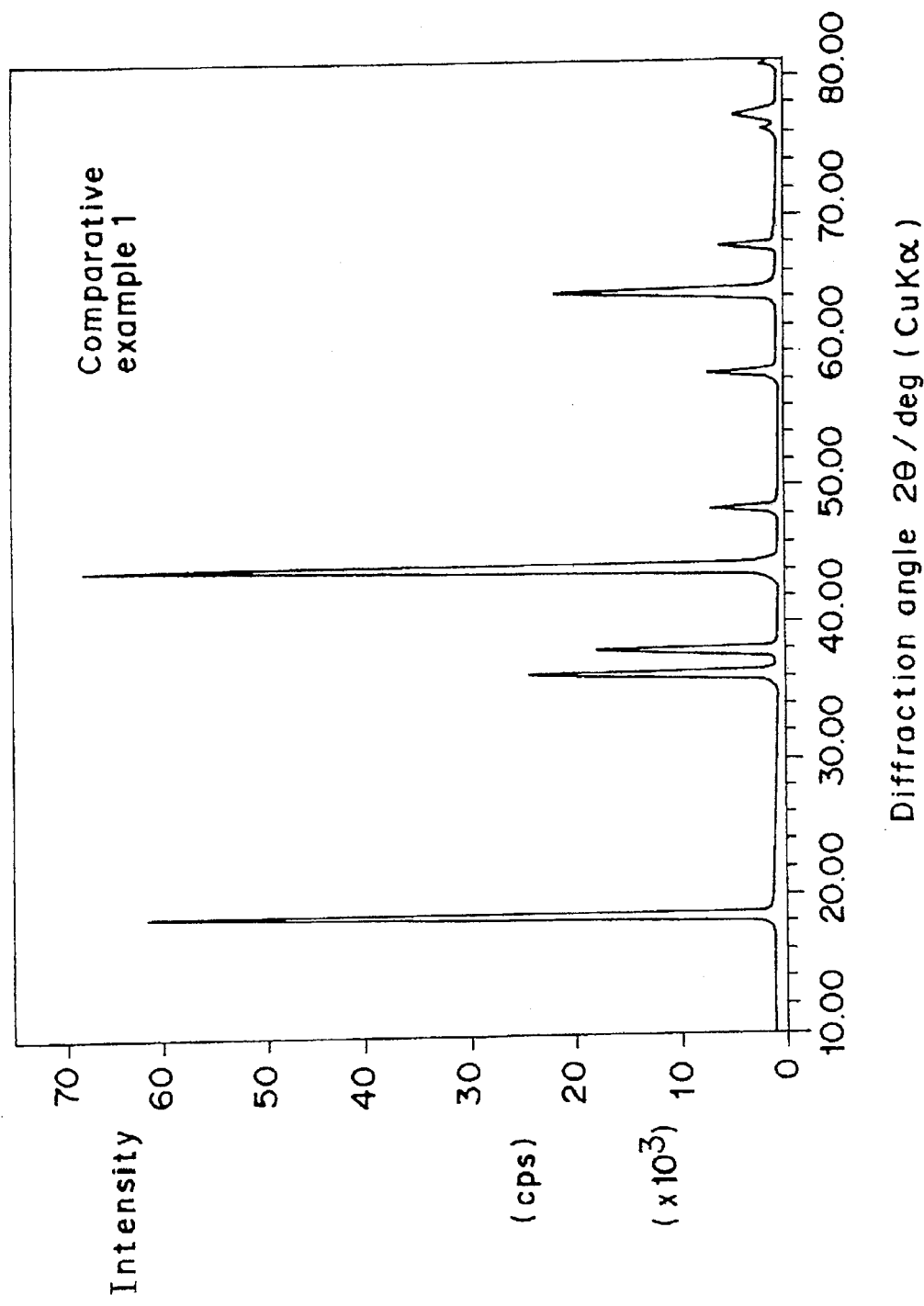
FIG. 8 is a diagram schematically showing X-ray diffraction image of lithium nickel oxide used as cathode active material in Comparative Example 1.

The powder X-ray diffraction image of the obtained lithium nickel oxide is schematically shown in FIG. 8. The intensity ratio of the main peak of other than lithium nickel oxide and the main peak of lithium nickel oxide was 0.015.

That is, the main peak of lithium nickel oxide was a peak appearing at 2θ=18° to 19°, and its intensity was 62656 cps, and the main peak of other than lithium nickel oxide was a peak appearing at 2θ=19.72°, and its intensity was 934 cps, and the intensity ratio of the main peak of other than lithium nickel oxide and the main peak of lithium nickel oxide was 0.015 as mentioned above.

The Li/Ni ratio (atomic ratio) in the synthesized lithium nickel oxide was 0.72 and the average grain size of the primary particles was 0.5 μm.

Using thus synthesized lithium nickel oxide as cathode active material, a button type lithium secondary battery was fabricated in the same manner as in Example 1.

Comparative Example 2

Lithium hydroxide hydrate (LiOH.$H_2O$) and nickel oxide (III) ($Ni_2O_3$) were weighed to be a ratio of Li/Ni=2.0/1 (molar salt ratio), and pulverized and mixed by using a ball mill, and heated to synthesize lithium nickel oxide. The condition of synthesis was same as in Example 1 except that the Li/Ni ratio (molar salt ratio) was changed to 2.0/1 (molar salt ratio). That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet as shown in FIG. 2, and the line width ($\Delta$Hpp) between the peaks was 178 mT.

Figure 9:
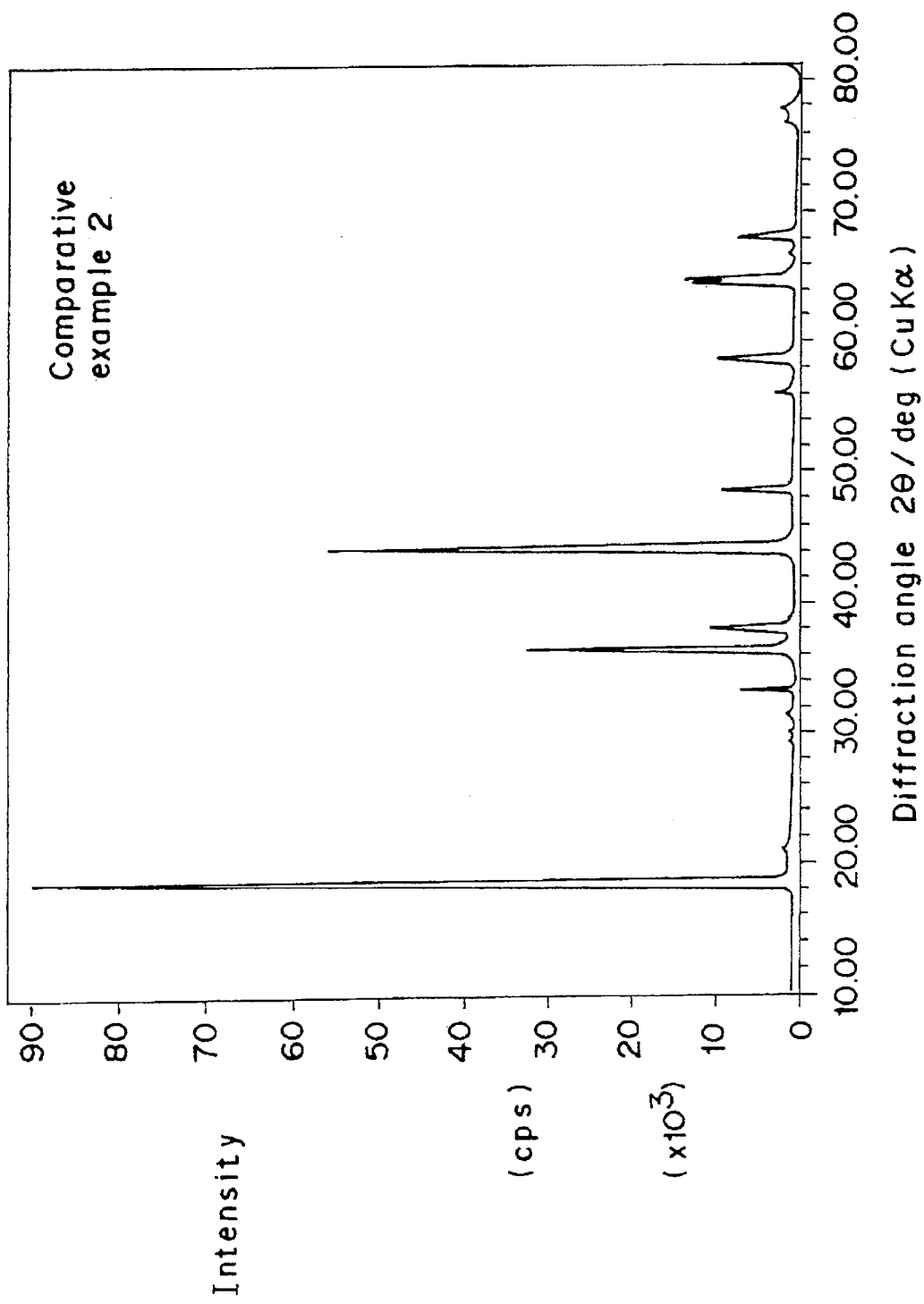
FIG. 9 is a diagram schematically showing X-ray diffraction image of lithium nickel oxide used as cathode active material in Comparative Example 2.

The powder X-ray diffraction image of the obtained lithium nickel oxide is schematically shown in FIG. 9. The intensity ratio of the main peak of other than lithium nickel oxide and the main peak of lithium nickel oxide was as larger as 0.073, and it contained much of other than lithium nickel oxide, or impurity.

That is, the main peak of lithium nickel oxide was a peak appearing at 2θ=18° to 19°, and its intensity was 90601 cps, and the main peak of other than lithium nickel oxide was a peak appearing at 2θ=33.52°, and its intensity was 6601 cps, and the intensity ratio of the main peak of other than lithium nickel oxide and the main peak of lithium nickel oxide was as large as 0.073 as mentioned above.

The Li/Ni ratio (atomic ratio) in the synthesized lithium nickel oxide was 0.93 and the average grain size of the primary particles was 0.5 μm.

Using thus synthesized lithium nickel oxide as cathode active material, a button type lithium secondary battery was fabricated in the same manner as in Example 1.

The batteries of Examples 1 to 4 and batteries of Comparative Examples 1 and 2 were charged and discharged at charging current of 0.393 mA and discharging current of 0.393 mA (0.5 mA/cm² per unit area of cathode), between voltages 4.3 and 2.5 V.

In these batteries, since the lithium nickel oxide is used as the cathode active material, they were first charged, and Li was extracted from the lithium nickel oxide, and the lithium nickel oxide was used as $Li_{1-x}NiO_2$ (x>0).

Table 1 shows the material charging Li/Ni ratio in Examples 1 to 4 and Comparative Examples 1 and 2, Li/Ni atomic ratio of synthesized lithium nickel oxide, line width ($\Delta$Hpp) between peaks of electron spin resonance spectrum, intensity ratio of main peak of other than lithium nickel oxide and main peak of lithium nickel oxide, the average grain size of the first grain of synthesized lithium nickel oxide and charging and discharging capacity.

In all of Examples 1 to 4 and Comparative Examples 1 and 2, the starting materials were lithium hydroxide hydrate (LiOH.H$_2$O) and nickel oxide (III) (Ni$_2$O$_3$), and Table 1 shows how 1) the line width (ΔHpp) of electron spin resonance spectrum, 2) the intensity ratio of main peak of other than lithium nickel oxide and main peak of lithium nickel oxide and 3) the charging and discharging capacity, vary depending on the difference of the material charging Li/Ni ratio (molar salt ratio).

TABLE 1

|  | Example | | | | Comparative Example | |
| --- | --- | --- | --- | --- | --- | --- |
|  | 1 | 2 | 3 | 4 | 1 | 2 |
| Material charging Li/Ni ratio (molar ratio) | 1.1 | 1.0 | 1.3 | 1.5 | 0.75 | 2.0 |
| Li/Ni ratio in lithium nickel oxide (atomic ratio) | 0.93 | 0.90 | 0.94 | 0.94 | 0.72 | 0.93 |
| ΔHpp (mT) | 166 | 165 | 175 | 177 | — | 178 |
| Intensity ratio of main peak of other than lithium nickel oxide and main peak of lithium nickel oxide | 0.0098 | 0.0099 | 0.016 | 0.027 | 0.015 | 0.073 |
| average grain size (μm) | 0.5 | 0.5 | 0.5 | 0.5 | 0.5 | 0.5 |
| Charging and discharging capacity (mAh/g) | 209 | 200 | 187 | 177 | 25 | 60 |

As shown in Table 1, Examples 1 to 4 presented large charging and discharging capacities of 209 mAh/g, 200 mAh/mg, 188 mAh/g and 177 mAh/g, respectively. In these Examples 1 to 4, ΔHpp (line width between peaks of electron spin resonance spectrum) was 166 mT, 165 mT, 175 mT and 177 mT, respectively, each of them was above 140 mT.

By contrast, Comparative Example 1 had a small charging and discharging capacity of 25 mAh/g. In this Comparative Example 1, the shape of the electron spin resonance spectrum was different from that of the Examples, and ΔHpp could not be detected. That is, ΔHpp is to express the electron state of nickel in the lithium nickel oxide, and failure of detection of ΔHpp in Comparative Example 1 seems to suggest that Comparative Example 1 has a different electron state from Examples 1 to 4 and is not suited to charging and discharging function.

Incidentally, that the electron state of lithium nickel oxide in Comparative Example 1 is different from that of Examples 1 to 4 is not contrary to the fact that the intensity is inverted between (003) peak and (104) peak, that is, the first peak at 2θ=18° to 19° and the second peak at 2θ=44° to 45° of Comparative Example 1 when the lithium nickel oxide is indexed as a hexagonal crystal in powder X-ray diffraction image and that the crystal structure of Comparative Example 1 is estimated to be different from the crystal structure of Examples 1 to 4.

Although the electron state was not clear, it has been found for the first time by the inventors that ΔHpp is detected also at temperature 77 K. in the structure of LiNiO$_2$ if the nickel is provided with valence of 3 having at least unpaired electrons and the surrounding circumstance of the structure is suited to the charging and discharging function.

In Comparative Example 2, the charging and discharging capacity was also small at 60 mAh/g. In this comparative Example 2, since the primary differential absorption spectrum of electron spin resonance is singlet and ΔHpp is 178 mT, it seems to contain a same structure as in Examples 1 to 4, but the impurity, that is, the peak of other than lithium nickel oxide is larger than in Examples 1 to 4, and the excess content of lithium becomes a compound other than lithium nickel oxide, which is considered to impede the charging and discharging reaction in the battery to decrease the charging and discharging capacity in Comparative Example 2.

Next Examples 5 to 7 and Comparative Examples 3 to 5 will make it clear how the heat treatment temperature in synthesis of lithium nickel oxide effect the Li/Ni ratio of the lithium nickel oxide and the charging and discharging capacity of lithium secondary battery.

EXAMPLE 5

Lithium oxide (Li$_2$O) and nickel oxide (III) (Ni$_2$O$_3$) were heated, and lithium nickel oxide was synthesized. This synthesis was conducted in the following procedure. Lithium oxide and nickel oxide (III) were weighed to be a ratio of Li/Ni=1.02/1 (molar salt ratio), and pulverized and mixed by using an agate mortar. The mixture was preheated to 500° C. in oxygen (O$_2$) stream for 2 hours, and raised up to 700° C. at heating rate of 50° C./hr or less, and baking at 700° C. was performed for 10 hours.

Figure 10:
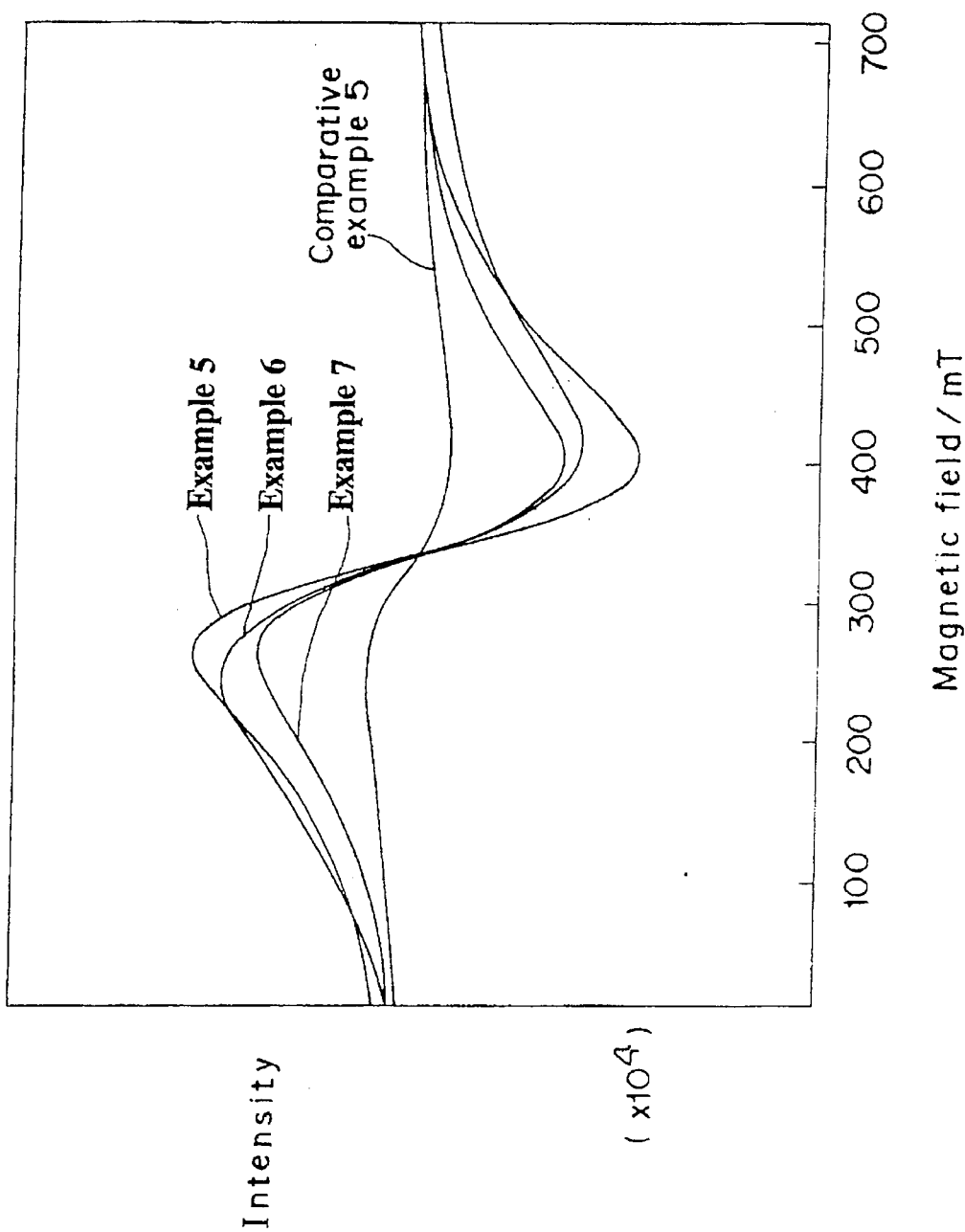
FIG. 10 is a diagram schematically showing electron spin resonance spectrum of lithium nickel oxide used as cathode active material in Examples 5 to 7 and Comparative Example 5.

The electron spin resonance of the synthesized lithium nickel oxide was measured in the same condition as in Example 1, and the primary differential absorption spectrum of electron spin resonance was singlet as shown in FIG. 10, and the line width (ΔHpp) between the peaks was 152 mT.

Figure 12:
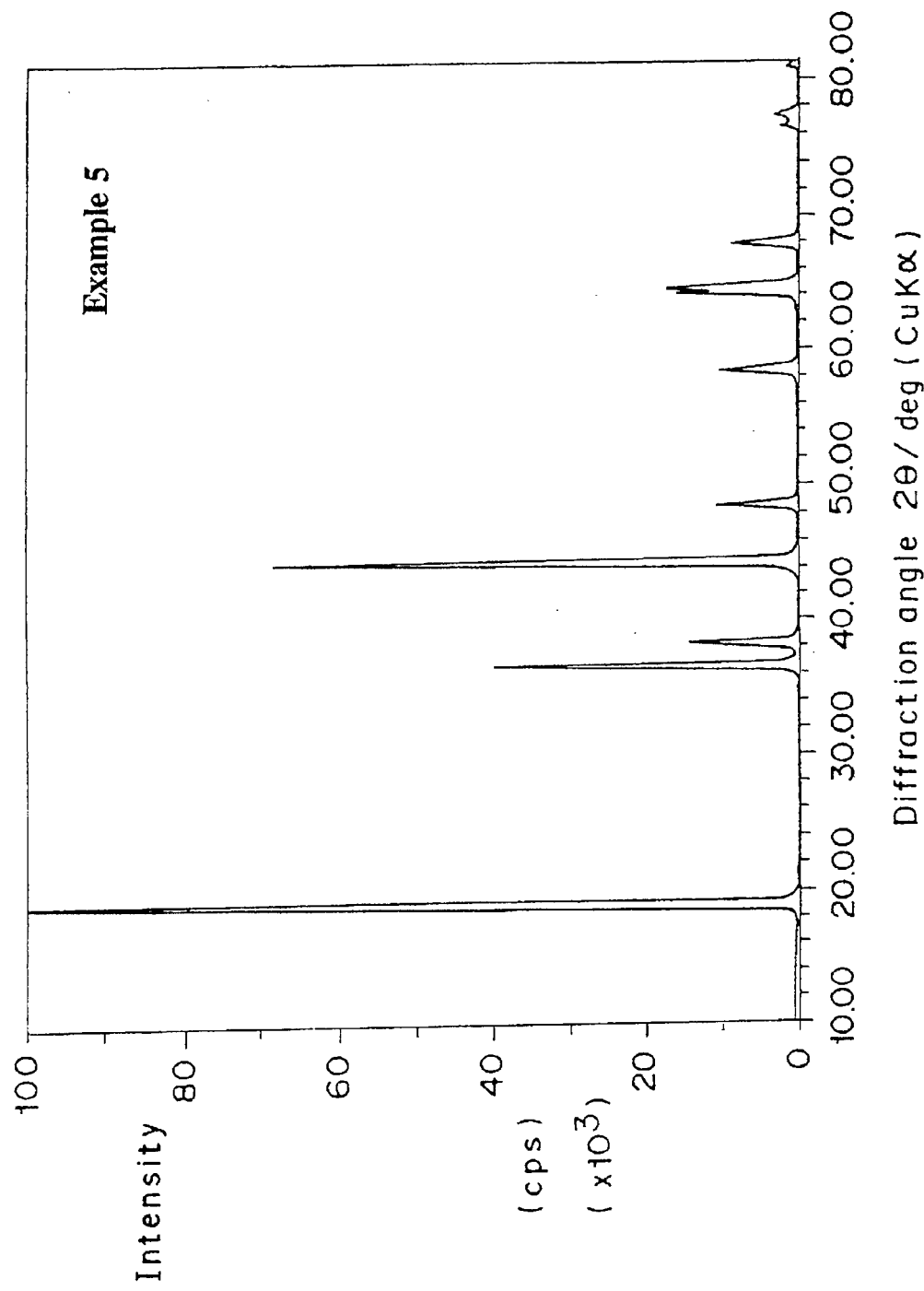
FIG. 12 is a diagram schematically showing X-ray diffraction image of lithium nickel oxide used as cathode active material in Example 5.

The powder X-ray diffraction image of the synthesized lithium nickel oxide is schematically shown in FIG. 12. According to the powder X-ray diffraction, the peak value of other than lithium nickel oxide, that is, the peak value of the impurity is less than detection limit and intensity ratio of the main peak of other than lithium nickel oxide and the main peak of lithium nickel oxide was 0.03 or less.

The Li/Ni ratio (atomic ratio) in the synthesized lithium nickel oxide was 0.90 and the average grain size of the primary particles was 0.5 μm.

Using thus synthesized lithium nickel oxide as the cathode active material, a button type lithium secondary battery was fabricated in the same manner as in Example 1.

Hereinafter, batteries including Example 5 use an organic electrolyte dissolving 0.6 mol/liter of LiCF3SO$_3$ into a mixed solvent of 1:1 ratio by volume of ethylene carbonate and 1,2-methoxyethane.

EXAMPLE 6

Lithium hydroxide hydrate (LiOH.H$_2$O) and nickel oxide (III) (Ni$_2$O$_3$) were heated at 700° C. to synthesize lithium nickel oxide. The condition of synthesis was same as in Example 5 except that lithium oxide was changed to lithium hydroxide hydrate. That is, as the heat treatment, the mixture was preheated to 500° C. in oxygen stream for 2 hours, and raised up to 700° C. at heating rate of 50° C./hr or less, and baking at 700° C. was performed for 10 hours.

The electron spin resonance of the synthesized lithium nickel oxide was measured in the same condition as in Example 1, and the primary differential absorption spectrum of electron spin resonance was singlet as shown in FIG. 10, and the line width ($\Delta$Hpp) between the peaks was 164 mT.

Figure 13:
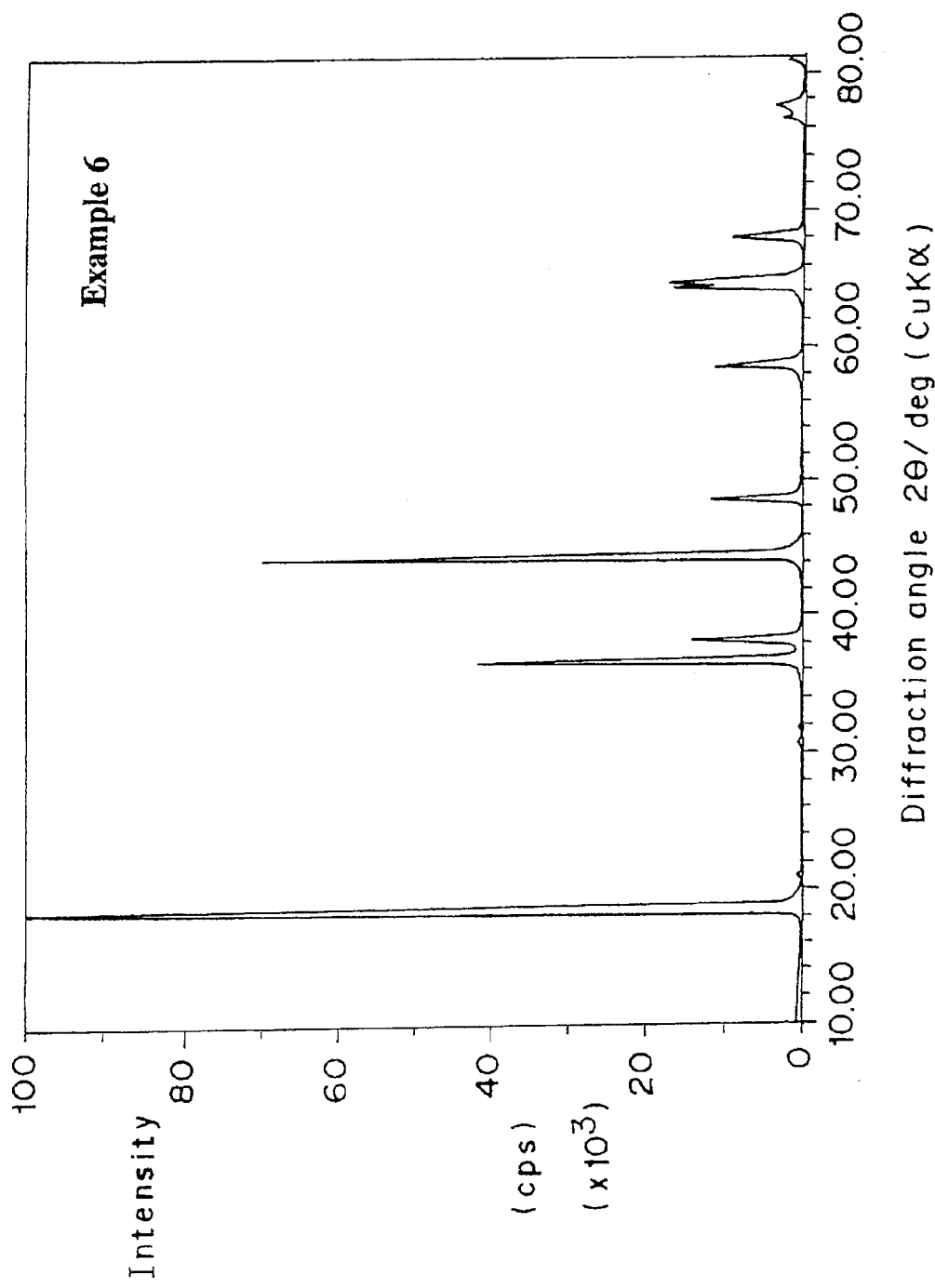
FIG. 13 is a diagram schematically showing X-ray diffraction image of lithium nickel oxide used as cathode active material in Example 6.

The powder X-ray diffraction image of the obtained lithium nickel oxide is schematically shown in FIG. 13. According to the powder X-ray diffraction, the main peak of other than lithium nickel oxide was a peak appearing at $2\theta=31.7°$, but its peak was small, and the intensity ratio of the main peak of other than lithium nickel oxide and the main peak of lithium nickel oxide was 0.0071.

The Li/Ni ratio (atomic ratio) in the synthesized lithium nickel oxide was 0.93 and the average grain size of the primary particles was 0.5 μm.

Using thus synthesized lithium nickel oxide as cathode active material, a button type lithium secondary battery was fabricated in the same manner as in Example 5.

EXAMPLE 7

Lithium oxide ($Li_2O$) and nickel oxide (III) ($Ni_2O_3$) were heated at 780° C. to synthesize lithium nickel oxide. The condition of synthesis was same as in Example 5 except that the baking temperature was changed from 700° C. to 780° C. That is, as the heat treatment, the mixture was preheated to 500° C. in oxygen stream for 2 hours, and raised up to 780° C. at heating rate of 50° C./hr or less, and baking at 780° C. was performed for 10 hours.

The electron spin resonance of the synthesized lithium nickel oxide was measured in the same condition as in Example 1, and the primary differential absorption spectrum of electron spin resonance was singlet as shown in FIG. 10 and the line width ($\Delta$Hpp) between the peaks was 146 mT.

Figure 14:
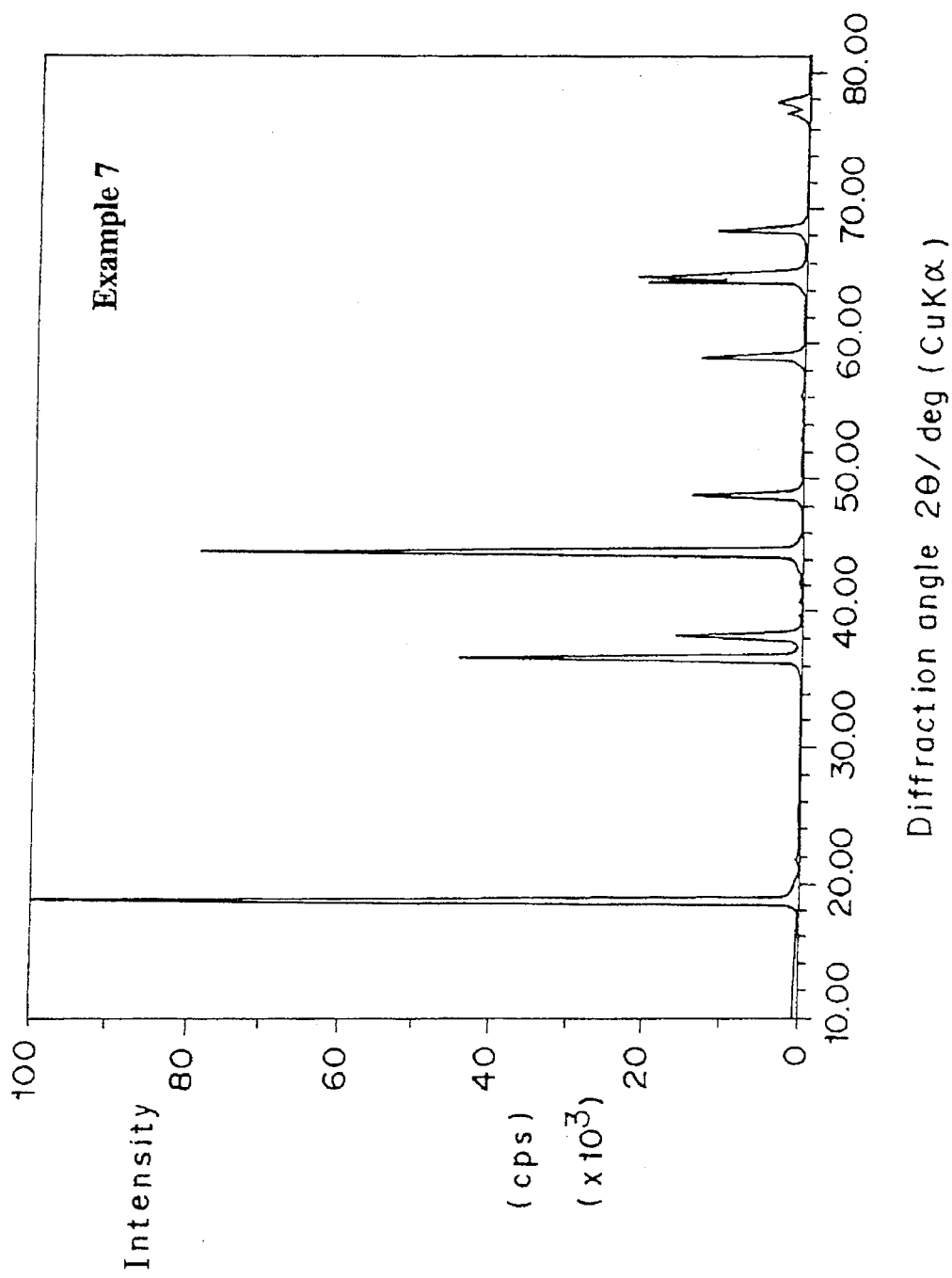
FIG. 14 is a diagram schematically showing X-ray diffraction image of lithium nickel oxide used as cathode active material in Example 7.

The powder X-ray diffraction image of the obtained lithium nickel oxide is schematically shown in FIG. 14. According to the powder X-ray diffraction, the peak value of other than lithium nickel oxide is less than detection limit, and intensity ratio of the main peak of other than lithium nickel oxide and the main peak of lithium nickel oxide was 0.03 or less.

The Li/Ni ratio (atomic ratio) in the synthesized lithium nickel oxide was 0.93 and the average grain size of the primary particles was 1 μm.

Using thus synthesized lithium nickel oxide as cathode active material, a button type lithium secondary battery was fabricated in the same manner as in Example 5.

Comparative Example 3

Lithium oxide ($Li_2O$) and nickel oxide (III) ($Ni_2O_3$) were heated at 900° C. to synthesize lithium nickel oxide. The condition of synthesis was same as in Example 5 except that the baking temperature was changed from 700° C. to 900° C. That is, as the heat treatment, the mixture was preheated to 500° C. in oxygen stream for 2 hours, and raised up to 900° C. at heating rate of 50° C./hr or less, and baking at 900° C. was performed for 10 hours.

Figure 11:
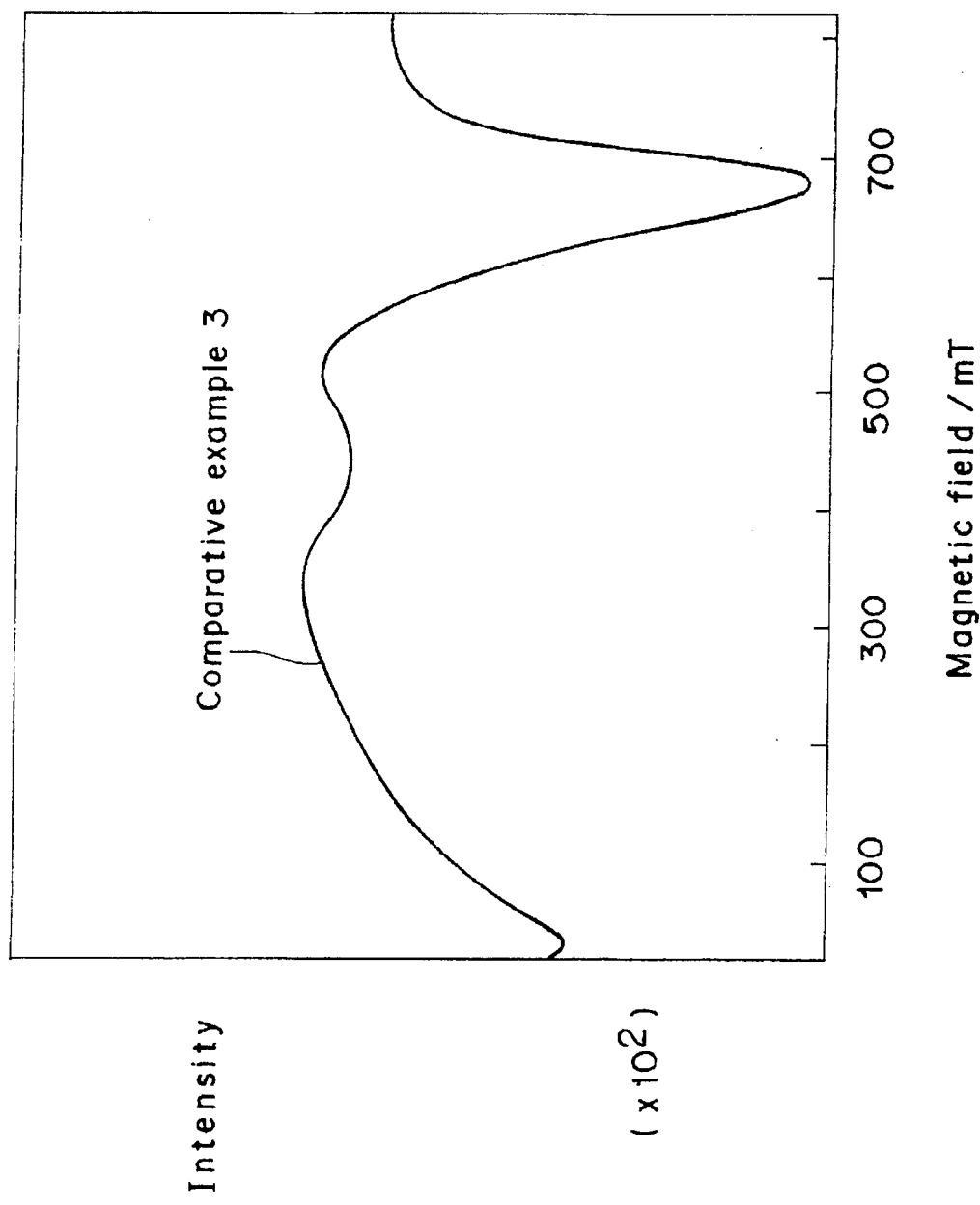
FIG. 11 is a diagram schematically showing electron spin resonance spectrum of lithium nickel oxide used as cathode active material in Comparative Example 3.

The electron spin resonance of the synthesized lithium nickel oxide was measured in the same condition as in Example 1, and the primary differential absorption spectrum of electron spin resonance was not singlet as Examples, and a super-broad profile was obtained as shown in FIG. 11, and its line width ($\Delta$Hpp) could not be detected.

Figure 15:
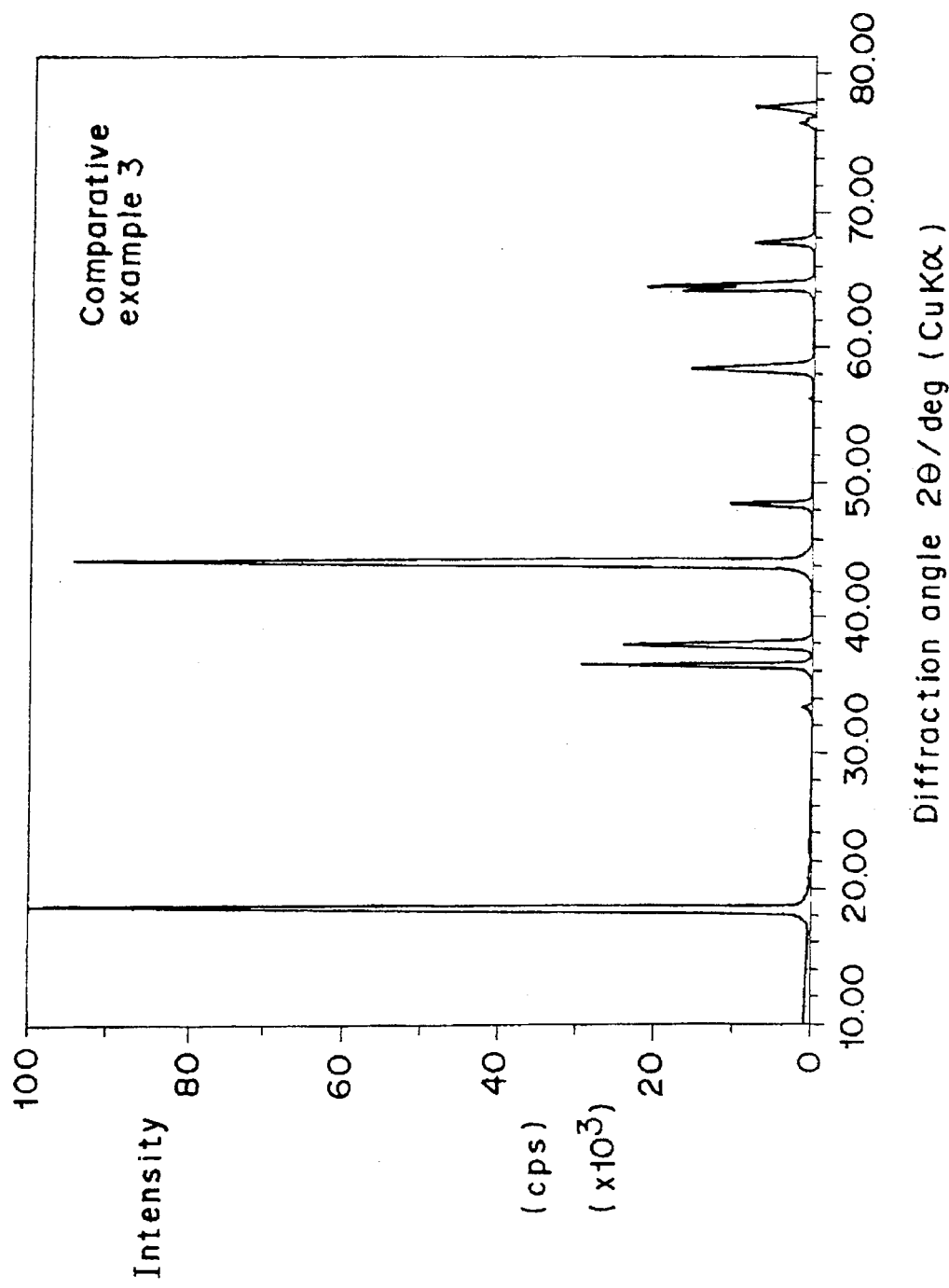
FIG. 15 is a diagram schematically showing X-ray diffraction image of lithium nickel oxide used as cathode active material in Comparative Example 3.

The powder X-ray diffraction image of the obtained lithium nickel oxide is schematically shown in FIG. 15. According to the powder X-ray diffraction, the main peak of other than lithium nickel oxide was a peak appearing at $2\theta=33.6°$, and the intensity ratio of the main peak of other than lithium nickel oxide and the main peak of lithium nickel oxide was 0.014.

The Li/Ni ratio (atomic ratio) in the synthesized lithium nickel oxide was 0.82 and the average grain size of the primary particles was 10 μm.

Using thus synthesized lithium nickel oxide as cathode active material, a button type lithium secondary battery was fabricated in the same manner as in Example 5.

Comparative Example 4

Lithium oxide ($Li_2O$) and nickel oxide (III) ($Ni_2O_3$) were heated at 1100° C. to synthesize lithium nickel oxide. The condition of synthesis was same as in Example 5 except that the baking temperature was changed from 700° C. to 1100° C. That is, as the heat treatment, the mixture was preheated to 500° C. in oxygen stream for 2 hours, and raised up to 1100° C. at heating rate of 50° C./hr or less, and baking at 1100° C. was performed for 10 hours.

The electron spin resonance of the synthesized lithium nickel oxide was measured in the same condition as in Example 1, and the primary differential absorption spectrum of electron spin resonance was not singlet as Examples, ad a super-broad profile was obtained, and its line width ($\Delta$Hpp) could not be detected.

Figure 16:
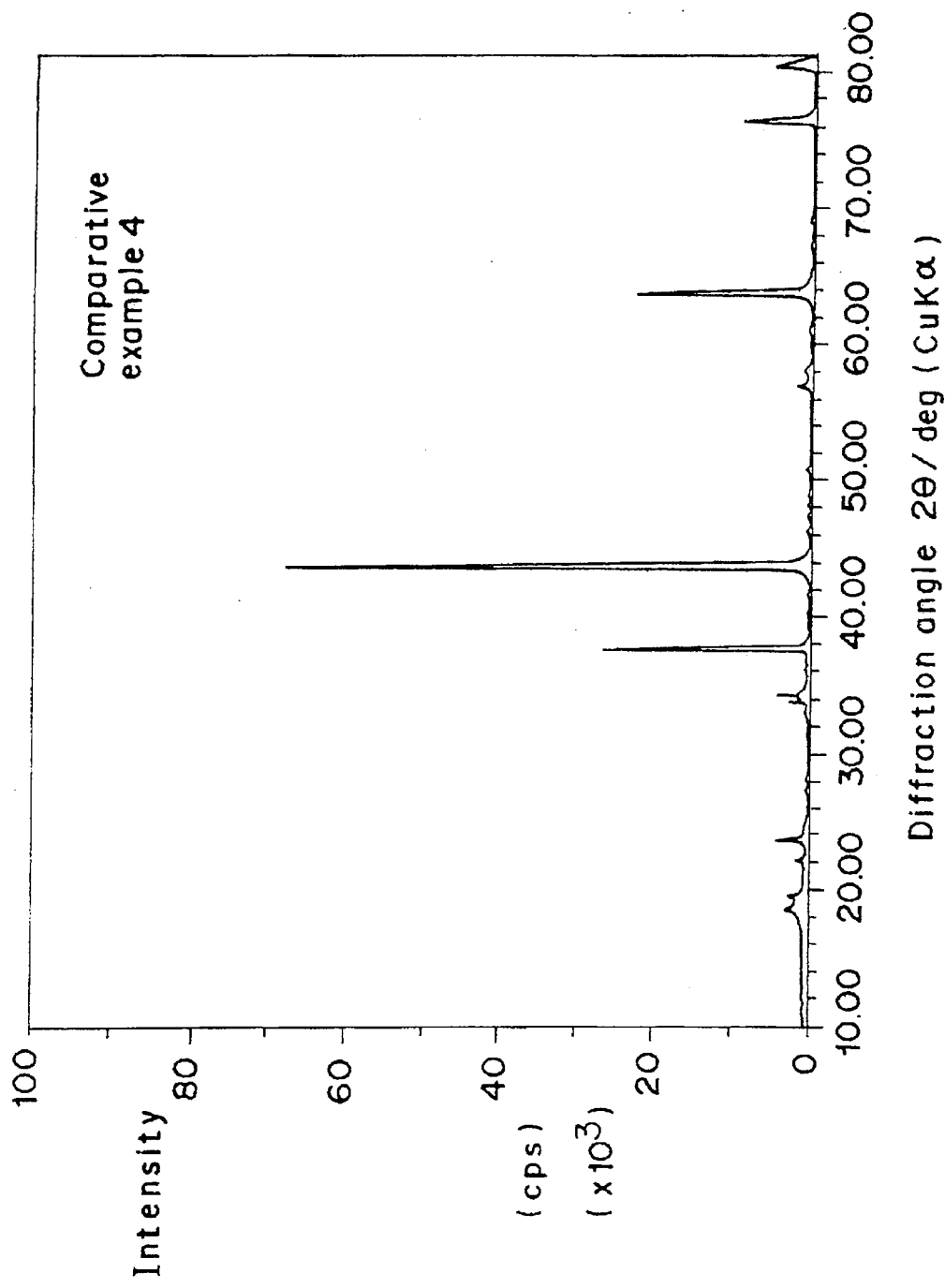
FIG. 16 is a diagram schematically showing X-ray diffraction image of lithium nickel oxide used as cathode active material in Comparative Example 4.

The powder X-ray diffraction image of the obtained lithium nickel oxide is schematically shown in FIG. 16. Lithium nickel oxide in Comparative Example 4 had different crystal form, and the main peak of other than lithium nickel oxide was not found.

The Li/Ni ratio (atomic ratio) in the synthesized lithium nickel oxide was 0.41 and the average grain size of the primary particles was 50 μm.

Using thus synthesized lithium nickel oxide as cathode active material, a button type lithium secondary battery was fabricated in the same manner as in Example 5.

Comparative Example 5

Lithium oxide ($Li_2O$) and nickel oxide (III) ($Ni_2O_3$) were heated at 500° C. to synthesize lithium nickel oxide. The condition of synthesis was same as in Example 5 except that the baking temperature was changed from 700° C. to 500° C. That is, as the heat treatment, the mixture was preheated to 500° C. in oxygen stream for 2 hours, and baking at 500° C. was performed for 10 hours.

The electron spin resonance of the synthesized lithium nickel oxide was measured in the same condition as in Example 1, and the spectrum of electron spin resonance, shown in FIG. 10, was not a singlet primary differential absorption spectrum as in Examples, and broad and weak, then, the line width ($\Delta$Hpp) was impossible to be detected.

Figure 17:
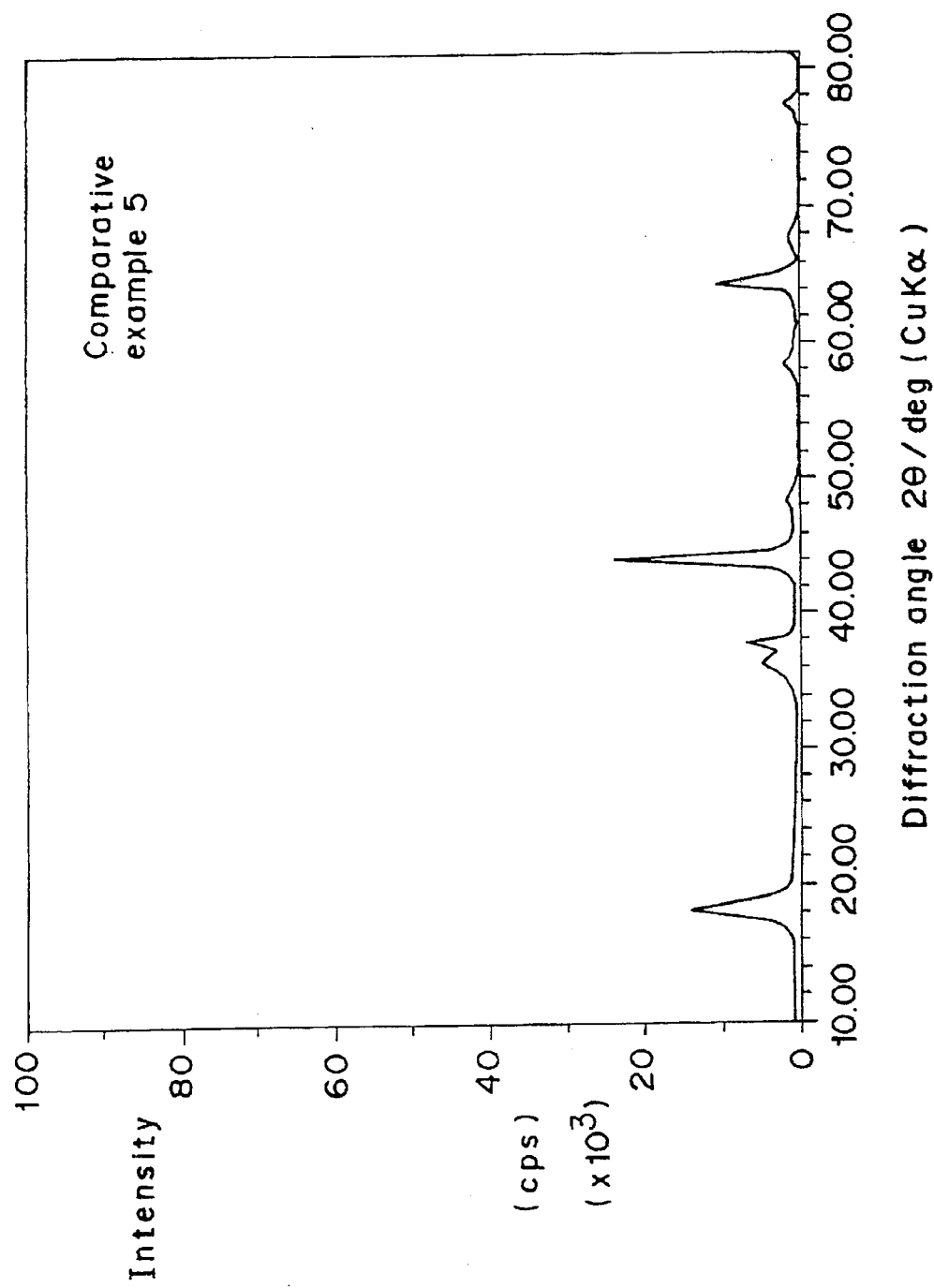
FIG. 17 is a diagram schematically showing X-ray diffraction image of lithium nickel oxide used as cathode active material in Comparative Example 5.

The powder X-ray diffraction image of the obtained lithium nickel oxide is schematically shown in FIG. 17. According to the powder X-ray diffraction image, the main peak of other than lithium nickel oxide was a peak appearing at $2\theta=31.43°$, and the intensity ratio of the main peak of other than lithium nickel oxide and the main peak of lithium nickel oxide was 0.056 and a lot of impurities were found.

The Li/Ni ratio (atomic ratio) in the synthesized lithium nickel oxide was 0.43 and the average grain size of the primary particles was 0.45 μm.

Using thus synthesized lithium nickel oxide as cathode active material, a button type lithium secondary battery was fabricated in the same manner as in Example 5.

The batteries of Examples 5 to 7 and batteries of Comparative Examples 3 to 5 were charged and discharged at charging current of 0.393 mA and discharging current of 0.393 mA (0.5 mA/cm² per unit area of cathode), between voltages 4.3 and 2.5 V. In these batteries, sinc the lithium nickel oxide was used as cathode active material, they were first charged, and Li was extracted from the lithium nickel oxide, and the lithium nickel oxide was used as $Li_{1-x}NiO_2$ (x>0).

Table 2 shows the baking temperature at synthesizing lithium nickel oxide in Examples 5 to 7 and Comparative Examples 3 to 5, Li/Ni atomic ratio of synthesized lithium nickel oxide, the line width (ΔHpp) between peaks of the primary differential absorption spectrum of electron spin resonance, the intensity ratio of the main peak of other than lithium nickel oxide and the main peak of lithium nickel oxide, the average grain size of the primary grain of synthesized lithium nickel oxide and charging and discharging capacity.

In all of Examples and Comparative Examples, the starting materials of Examples 5 and 7 and Comparative Examples 3 to 5 were lithium oxide ($Li_2O$) and nickel oxide (III) ($Ni_2O_3$), and Table 2 shows the line width (ΔHpp) of the electron spin resonance spectrum, the average grain size of the primary particles and the change of the charging and discharging capacity depending on the difference of the baking temperature.

That is, ΔHpp is to express the electron state of nickel in the lithium nickel oxide, and the failures of detection of ΔHpp in Comparative Examples 3 and 4 seem to suggest that Comparative Examples 3 and 4 have a different electron state from Examples 5 to 7 and is not suitable to charging and discharging.

The electron state on lithium nickel oxides in Comparative Examples 3 and 4 is different from those in Examples 5 to 7, and the crystal structure of lithium nickel oxide in Comparative Examples 3 and 4 is thought to be different from those in Examples 5 to 7, and these does not conflict with each other.

Although the electron state was not clear, at least it was discovered for the first time in the present invention that ΔHpp is detected also at temperature 77 K. in the structure of $LiNiO_2$ suited to charging and discharging in the surrounding circumstance, in the state of nickel with valence of 3 having at least the unpaired electrons.

The lithium nickel oxide in Example 5 is calcined at 500° C., and the signal of the electron spin resonance is weak, ¼ as that of Example 5, so, we can think that the lithium nickel oxide does not fully react, so the $LiNiO_2$ structure suitable for charging and discharging present only partially. We can get the same conclusion from the result of the powder X-ray diffraction analysis.

From these results, we can get a clear conclusion that a lithium secondary battery can be prepared using lithium nickel oxide whose electron state give the ΔHpp value more than 140 mT.

The following explanation is about the effect on the charging and discharging capacity of the battery depending on the Li/Ni ratio of lithium nickel oxide and the average grain size of the primary particles.

TABLE 2

|  | Example | | | Comparative Example | | |
| --- | --- | --- | --- | --- | --- | --- |
|  | 5 | 6 | 7 | 3 | 4 | 5 |
| Baking temperature (°C.) | 700 | 700 | 780 | 900 | 1100 | 500 |
| Li/Ni ratio in lithium nickel oxide (atomic ratio) | 0.93 | 0.93 | 0.93 | 0.82 | 0.41 | 0.43 |
| ΔHpp (mT) | 152 | 164 | 146 | — | — | — |
| Intensity ratio of main peak of other than lithium nickel oxide and main peak of lithium nickel oxide | less than detection limit | 0.0071 | less than detection limit | 0.014 | different crystal form and impossible to detect | 0.056 |
| Average grain size (μm) | 0.5 | 0.5 | 1 | 10 | 50 | 0.45 |
| Charging and discharging capacity (mAh/g) | 189 | 221 | 153 | 69 | 5 | 37 |

As shown in Table 2, Examples 5 to 7 presented large charging and discharging capacities of 189 mAh/g, 221 mAh/mg and 153 mAh/g, respectively. In these Examples 5 to 7, ΔHpp was 152 mT, 164 mT, 146 mT and 140 mT, respectively, each of them was 140 mT or more.

By contrast, Comparative Examples 3 to 5 presented small charging and discharging capacity of 69 mAh/g, 5 mAh/g and 37 mAh/g, respectively. In these Comparative Examples 3 to 5, the shape of the electron spin resonance spectrum was different from that of the embodiments, and ΔHpp could not be detected.

EXAMPLE 8

Lithium oxide ($Li_2O$) and nickel oxide (III) ($Ni_2O_3$) were heated to synthesize lithium nickel oxide. This synthesis was conducted in the following procedure.

Lithium oxide and nickel oxide were weighed to be a ratio of Li/Ni=1/1 (molar salt ratio), and pulverized and mixed by using an agate mortar. The mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet, and the line width ($\Delta$Hpp) between the peaks was 150 mT.

According to the powder X-ray diffraction of synthesized lithium nickel oxide, the peak other than lithium nickel oxide, that is, the peak of impurities was less than the detection limit, moreover, the intensity ratio of the main peak other than lithium nickel oxide and the main peak of lithium nickel oxide obtained from this powder X-ray diffraction image was 0.03 or less.

The Li/Ni ratio (atomic ratio) in the synthesized lithium nickel oxide was 0.90 and the average grain size of the primary particles was 0.5 μm.

By using lithium nickel oxide prepared by heat treatment as the cathode active material, a button type lithium secondary battery was fabricated as in the same manner in Example 5.

Using thus synthesized lithium nickel oxide as cathode active material, a button type lithium secondary battery was fabricated in the same manner as in Example 5.

EXAMPLE 9

Lithium hydroxide hydrate (LiOH.H$_2$O) and nickel oxide (III) (Ni$_2$O$_3$) were heated at 700° C. to synthesize lithium nickel oxide. The condition of synthesis was same as in Example 8 except that lithium oxide was changed to lithium hydroxide hydrate. That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet, and the line width ($\Delta$Hpp) between the peaks was 165 mT.

According to the powder X-ray diffraction of the obtained lithium nickel oxide, the main peak of other than lithium nickel oxide was a peak appearing at 2θ=21.36°, but its peak was small, and the intensity ratio of the main peak of other than lithium nickel oxide and the main peak of lithium nickel oxide was 0.0090, which is below 0.03.

The Li/Ni ratio (atomic ratio) in the synthesized lithium nickel oxide was 0.90 and the average grain size of the primary particles was 0.5 μm.

Using thus synthesized lithium nickel oxide as cathode active material, a button type lithium secondary battery was fabricated in the same manner as in Example 8.

Comparative Example 6

Lithium oxide (Li$_2$O) and nickel oxide (III) (Ni$_2$O$_3$) were heated at 800° C. to synthesize lithium nickel oxide. The condition of synthesis was same as in Example 8 except that the baking temperature was changed from 700° C. to 800° C. That is, as the heat treatment, the mixture was preheated to 500° C. in oxygen stream for 2 hours, and raised up to 800° C. at heating rate of 50° C./hr or less, and baking at 800° C. was performed for 20 hours.

The electron spin resonance of the synthesized lithium nickel oxide was measured in the same condition as in Example 1, and the primary differential absorption spectrum of electron spin resonance was singlet, but the line width ($\Delta$Hpp) was small as 135 mT.

According to the powder X-ray diffraction of the obtained lithium nickel oxide, the peak other than lithium nickel oxide was small and less than the detection limit.

The Li/Ni ratio (atomic ratio) in the synthesized lithium nickel oxide was 0.94 and the average grain size of the primary particles was 3 μm.

Using thus synthesized lithium nickel oxide as cathode active material, a button type lithium secondary battery was fabricated in the same manner as in Example 8.

Comparative Example 7

Lithium oxide (Li$_2$O) and nickel oxide (III) (Ni$_2$O$_3$) were heated at 900° C. to synthesize lithium nickel oxide. The condition of synthesis was same as in Example 8 except that the baking temperature was changed from 700° C. to 900° C. That is, as the heat treatment, the mixture was preheated to 500° C. in oxygen stream for 2 hours, and raised up to 900° C. at heating rate of 50° C./hr or less, and baking at 900° C. was performed for 20 hours.

The electron spin resonance of the synthesized lithium nickel oxide was measured in the same condition as in Example 1, but the electron spin resonance spectrum was not a primary differential absorption spectrum of singlet as in the foregoing embodiments, a super-broad profile was obtained ,and its line width ($\Delta$pp) could not be detected.

According to the powder X-ray diffraction of the obtained lithium nickel oxide, the main peak of other than lithium nickel oxide was a peak appearing at 2θ=33.66°, and the intensity ratio of the main peak of other than lithium nickel oxide and the main peak of lithium nickel oxide was 0.0084.

The Li/Ni ratio (atomic ratio) in the synthesized lithium nickel oxide was 0.82 and the average grain size of the primary particles was 10 μm.

Using thus synthesized lithium nickel oxide as cathode active material, a button type lithium secondary battery was fabricated in the same manner as in Example 8.

Comparative ExampLe 8

Lithium oxide (Li$_2$O) and nickel oxide (III) (Ni$_2$O$_3$) were heated at 1100° C. to synthesize lithium nickel oxide. The condition of synthesis was same as in Example 8 except that the baking temperature was changed from 700° C. to 1100° C. That is, as the heat treatment, the mixture was preheated to 500° C. in oxygen stream for 2 hours, and raised up to 1100° C. at heating rate of 50° C./hr or less, and baking at 1100° C. was performed for 20 hours.

The electron spin resonance of the synthesized lithium nickel oxide was measured in the same condition as in Example 1, but the electron spin resonance spectrum was not a primary differential absorption spectrum of singlet as in the foregoing embodiments, a super-broad profile was obtained, and its line width ($\Delta$Hpp) could not be detected.

According to the powder X-ray diffraction of the synthesized lithium nickel oxide, lithium nickel oxide in Comparative Example 8 had different crystal construction and the main peak of other than lithium nickel oxide was not found.

The Li/Ni ratio (atomic ratio) in the synthesized lithium nickel oxide was 0.41 and the average grain size of the primary particles was 50 μm.

Using thus synthesized lithium nickel oxide as the cathode active material, a button type lithium secondary battery was fabricated in the same manner as in Example 8.

Comparative Example 9

Lithium oxide ($Li_2O$) and nickel oxide (III) ($Ni_2O_3$) were heated at 500° C. to synthesize lithium nickel oxide. The condition of synthesis was same as in Example 8 except that the baking temperature was changed from 700° C. to 500° C. That is, as the heat treatment, the mixture was preheated to 500° C. in oxygen stream for 2 hours, and baking at 500° C. was performed for 20 hours.

The electron spin resonance of the synthesized lithium nickel oxide was measured in the same condition as in Example 1, and the primary differential absorption spectrum of electron spin resonance was broad and a weak signal, then, its line width (ΔHpp) could not be detected.

According to the powder X-ray diffraction of the synthesized lithium nickel oxide, the main peak of other than lithium nickel oxide was a peak appearing at 2θ=31.48°, and the intensity ratio of the main peak of other than lithium nickel oxide and the main peak of lithium nickel oxide was 0.055 and a lot of impurities were found.

The Li/Ni ratio (atomic ratio) in the synthesized lithium nickel oxide was 0.45 and the average grain size of the primary particles was 0.5 μm.

Using thus synthesized lithium nickel oxide as the cathode active material, a button type lithium secondary battery was fabricated in the same manner as in Example 8.

Comparative Example 10

Lithium carbonate ($Li_2CO_3$) and nickel carbonate ($NiCO_3$) were heated at 700° C. to synthesize lithium nickel oxide. The condition of synthesis was same as in Example 8 except that lithium oxide and nickel oxide (III) were changed to lithium carbonate and nickel carbonate, respectively. That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet, but the line width (ΔHpp) was small as 117 mT.

According to the powder X-ray diffraction of the synthesized lithium nickel oxide, the main peak of other than lithium nickel oxide was a peak appearing at 2θ=31.78°, and the intensity ratio of the main peak of other than lithium nickel oxide and the main peak of lithium nickel oxide was 0.0085.

The Li/Ni ratio (atomic ratio) in the synthesized lithium nickel oxide was 0.86 and the average grain size of the primary particles was 0.5 μm.

Using thus synthesized lithium nickel oxide as the cathode active material, a button type lithium secondary battery was fabricated in the same manner as in Example 8.

Comparative Example 11

Lithium carbonate ($Li_2CO_3$) and nickel nitrate haxahydrate [$Ni(NO_3)_2.6H_2O$] were heated at 700° C. to synthesize lithium nickel oxide. The condition of synthesis was same as in Example 8 except that lithium oxide and nickel oxide were changed to lithium carbonate and nickel nitrate hexahydate, respectively. That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet, but the line width (ΔHpp) was small as 106 mT.

According to the powder X-ray diffraction of the synthesized lithium nickel oxide, the main peak of other than lithium nickel oxide was a peak appearing at 2θ=33.54° and the intensity ratio of the main peak of other than lithium nickel oxide and the main peak of lithium nickel oxide was 0.0060.

The Li/Ni ratio (atomic ratio) in the synthesized lithium nickel oxide was 0.88 and the average grain size of the primary particles was 0.5 μm.

Using thus synthesized lithium nickel oxide as cathode active material, a button type lithium secondary battery was fabricated in the same manner as in Example 8.

Comparative Example 12

Lithium nitrate ($LiNO_3$) and nickel carbonate ($NiCO_3$) were heated at 700° C. to synthesize lithium nickel oxide. The condition of synthesis was same as in Example 8 except that lithium oxide and nickel oxide (III) were changed to lithium nitrate and nickel carbonate, respectively. That is, as the heat treatment, the mixture was preheated to 500° C. in oxygen stream for 2 hours, and raised up to 700° C. at heating rate of 50° C./hr or less, and baking at 700° C. was performed for 20 hours.

The electron spin resonance of the synthesized lithium nickel oxide was measured in the same condition as in Example 1, and the primary differential absorption spectrum of electron spin resonance was singlet, but the line width (ΔHpp) was small as 104 mT.

According to the powder X-ray diffraction of the synthesized lithium nickel oxide, the main peak of other than lithium nickel oxide was a peak appearing at 2θ=21.32°, and the intensity ratio of the main peak of other than lithium nickel oxide and the main peak of lithium nickel oxide was 0.0072.

The Li/Ni ratio (atomic ratio) in the synthesized lithium nickel oxide was 0.88 and the average grain size of the primary particles was 0.5 μm.

Using thus synthesized lithium nickel oxide as cathode active material, a button type lithium secondary battery was fabricated in the same manner as in Example 8.

The batteries of Examples 8 and 9 and batteries of Comparative Examples 6 to 12 were charged and discharge at charging current of 0.393 mA and discharging current of 1.57 mA (2 mA/cm$^2$ per unit area of cathode), between voltages 4.3 and 2.5 V.

In these batteries, sine the lithium nickel oxide is used as cathode active material, they were first charged, and Li was extracted from the lithium nickel oxide, and the lithium nickel oxide was used as $Li_{1-x}NiO_2$ (x>0).

Table 3 shows relations between 1) the baking temperature at synthesizing lithium nickel oxide in Examples 8 and 9 and Comparative Examples 6 to 9, 2) the Li/Ni ratio of synthesized lithium nickel oxide, 3) the line width (ΔHpp) between peaks of the primary differential absorption spectrum of electron spin resonance, 4) the intensity ratio of main peak of other than lithium nickel oxide and main peak of lithium nickel oxide, 5) the average grain size of the primary grain of synthesized lithium nickel oxide and 6) the charging and discharging capacity. In these Examples and Comparative Examples, the starting materials were lithium oxide ($Li_2O$) and nickel oxide (III) ($Ni_2O_3$) in each of Example 8 and Comparative Examples 6 to 9, and Table 3 shows how the Li/Ni atomic ratio of synthesized lithium nickel oxide, the average grain size and the charging and discharging capacity vary depending on the difference of the baking temperature.

As shown in Table 3, Examples 8 and 9 presented the large charging and discharging capacities of 160 mAh/g and 200 mAh/m, respectively by contrast to Comparative Examples 6 to 8. The result shows that the baking temperature is preferred to be low of 700° C. and the smaller grain size has good characteristics.

By contrast, Comparative Example 9 presented the small charging and discharging capacity of 33 mAh/g, which causes from that a baking temperature as low as 500° C. can not make the reaction proceed sufficiently, so that sufficient lithium nickel oxide can not be obtained. In Comparative Example 6, the Li/Ni ratio (atomic ratio) is 0.94, close to 1, but the grain size of lithium nickel oxide is small to make the charging and discharging small. Further, in Comparative Example 6, the line width (ΔHpp) between peaks of the primary differential absorption spectrum of electron spin resonance is below 140 mT as shown in Table 3. It is believed that such small ΔHpp makes the charging and discharging capacity small.

TABLE 4

|  | Raw material | Li/Ni ratio (atomic ratio) | ΔHpp (mT) | Charging and discharging capacity (mAh/g) |
|---|---|---|---|---|
| Example 8 | $Li_2O + Ni_2O_3$ | 0.90 | 150 | 160 |
| Example 9 | $LiOH.H_2O + Ni_2O_3$ | 0.90 | 165 | 200 |
| Comparative Example 10 | $Li_2CO_3 + NiCO_3$ | 0.86 | 117 | 138 |
| Comparative Example 11 | $Li_2CO_3 + Ni(NO_3)_2$ | 0.88 | 106 | 135 |
| Comparative Example 12 | $LiNO_3 + NiCO_3$ | 0.88 | 104 | 128 |

Furthermore, Table 4 shows relations between 1) the starting materials of Examples 8 and 9 and Comparative Examples 10 to 12, 2) the Li/Ni atomic ratio of synthesized lithium nickel oxide, 3) the line width (ΔHpp) between peaks of the primary differential absorption spectrum of electron spin resonance and 4) the charging and discharging capacity. In these Examples 8 and 9 and Comparative Examples 10 to 12, the starting materials of were different but the baking temperature were all 700° C. and the average grain size of products were all 0.5 μm. Table 4 shows how the Li/Ni atomic ratio of the synthesized lithium nickel oxide and the charging and discharging capacity vary depending on the difference of the starting materials.

As shown in Table 4, both Examples 8 and 9 presented Li/Ni atomic ratio of lithium nickel oxide of 0.90 and large charging and discharging capacity by contrast to Comparative Examples 10 to 12.

That is, Examples 8 and 9 using nickel oxide (III) ($Ni_2O_3$) containing nickel with valence of 3 as starting material, presented the charging and discharging capacity as large as 160 mAh/g and 200 mAh/g, respectively, compared with Comparative Examples 10 to 12 which used another starting material.

In the above Examples, the baking was carried out in the oxygen stream, but it can be carried out under the oxygen pressure. Furthermore, lithium nickel oxide was synthesized by lithium oxide($Li_2O$) and nickel oxide (III) ($Ni_2O_3$) as the starting material while changing the oxygen density. Higher

TABLE 3

|  | Example | | Comparative Example | | | |
|---|---|---|---|---|---|---|
|  | 8 | 9 | 6 | 7 | 8 | 9 |
| Baking temperature (°C.) | 700 | 700 | 800 | 900 | 1100 | 500 |
| Li/Ni ratio in lithium nickel oxide (atomic ratio) | 0.90 | 0.90 | 0.94 | 0.82 | 0.41 | 0.45 |
| ΔHpp (mT) | 150 | 165 | 135 | — | — | — |
| Intensity ratio of main peak of other than lithium nickel oxide and main peak of lithium nickel oxide | less than detection limit | 0.0090 | less than detection limit | 0.0084 | different crystal form and impossible to detect | 0.055 |
| Average grain size (μm) | 0.5 | 0.5 | 3 | 10 | 50 | 0.5 |
| Charging and discharging capacity (mAh/g) | 160 | 200 | 109 | 67 | 0 | 33 | the oxygen density becomes, closer to 1 the Li/Ni atomic ratio is.

Furthermore, the Li/Ni ratio (atomic ratio) of lithium nickel oxide was 0.9 or more in the present invention, but all the Li/Ni ratio shown in Examples are not beyond "1". As a result of the present invention, however, it is possible to use it as cathode active materials, what the Li/Ni ratio exceeded 1, for example, $Li_{1+x}Ni_{1-x}O_2$ (x>0, lithium nickel oxide of Li excess), $Li_2NiO_2$ and $Li_2NiO_{3-a}$, although the characteristics such as voltage and capacity are different.

INDUSTRIAL APPLICABILITY

As mentioned herein, according to the present invention, there is provided a lithium secondary battery with a larger charging and discharging capacity by using, as a cathode active material, a lithium nickel oxide of which primary differential absorption spectrum of electron spin resonance measured at temperature 77 K. by using X band is a singlet, and the intensity ratio of main peak of other than lithium nickel oxide and main peak of lithium nickel oxide in powder X-ray diffraction image (CuKα ray) is 0.03 or less.

What is claimed is:

1. A lithium secondary battery, which comprises:

a cathode comprising a lithium nickel oxide as an active material, an anode comprising lithium or a compound containing lithium and an organic electrolyte, wherein the cathode active material is a lithium nickel oxide having a primary differential absorption spectrum of electron spin resonance measured at a temperature of 77 K. by using X band that is a singlet, and an intensity ratio of a main peak other than lithium nickel oxide and a main peak of lithium nickel oxide in a powder X-ray diffraction image (CuKα ray) that is 0.03 or less.

2. The lithium secondary battery containing organic electrolyte according to claim 1, wherein the lithium nickel oxide has an electronic structure which indicates the line width (ΔHpp) between the peaks of the primary differential absorption spectrum of the electron spin resonance measured at a temperature of 77 K. by using X band is 140 mT or more.

3. A lithium secondary battery containing organic electrolyte according to claims 1 or 2, wherein Li/Ni ratio (atomic ratio) of the said lithium nickel oxide is 0.9 or more and the average grain size of the primary particles is 1 μm or less.

4. A cathode active material for a lithium secondary battery containing an organic electrolyte, mainly composed of a lithium nickel oxide having a primary differential absorption spectrum of electron spin resonance measured at a temperature of 77 K. by using X band that is a singlet, and an intensity ratio of a main peak other than lithium nickel oxide and a main peak of lithium nickel oxide in a powder X-ray diffraction image (CuKα ray) that is 0.03 or less.

5. A cathode active material for the lithium secondary battery containing an organic electrolyte according to claim 4, wherein the lithium nickel oxide has an electronic structure which indicates the line width (ΔHpp) between the peaks of the primary differential absorption spectrum of the electron spin resonance measured at a temperature of 77 K. by using X band is 140 mT or more.

6. A cathode active material for the lithium secondary battery containing an organic electrolyte according to claim 4 or 5, wherein said lithium nickel oxide possesses a Li/Ni ratio (atomic ratio) of 0.9 or more, and wherein an average grain size of the primary particles thereof is 1 μm or less.

7. A method of synthesizing the lithium nickel oxide of the cathode in the lithium secondary battery according to claim 1, 2 or 3, which comprises the steps of:

mixing a nickel oxide containing nickel with a valence of 3 or more, or a nickel salt producing nickel with a valence of 3 or more by heating, and a lithium salt, at a ratio of Li/Ni (molar salt ratio) of 1.0 to 1.5, and heating the mixture at a temperature of 680° to 780° C.

8. A method of synthesizing the lithium nickel oxide of the cathode in the lithium secondary battery according to claim 7, wherein the nickel oxide containing nickel with valence of 3 or more is $Ni_2O_3$.

9. A method of synthesizing the lithium nickel oxide of the cathode in the lithium secondary battery according to claim 8, wherein the heating takes place in an atmosphere that is an oxygen stream or under an oxygen pressure.

10. A method of synthesizing the lithium nickel oxide according to claim 3 used for a lithium secondary battery containing an organic electrolyte which comprises steps of:

mixing nickel oxide containing nickel with valence of 3 or more or nickel salt producing nickel with valence of 3 or more by heating, and lithium salt, at a ratio of Li/Ni (molar salt ratio)=1.0 to 1.5, and heating the mixture at a temperature of 680° to 780° C.

* * * * *